US010639814B2

(12) United States Patent
Ciuperca

(10) Patent No.: US 10,639,814 B2
(45) Date of Patent: May 5, 2020

(54) INSULATED CONCRETE BATTERY MOLD, INSULATED PASSIVE CONCRETE CURING SYSTEM, ACCELERATED CONCRETE CURING APPARATUS AND METHOD OF USING SAME

(71) Applicant: Romeo Ilarian Ciuperca, Atlanta, GA (US)

(72) Inventor: Romeo Ilarian Ciuperca, Atlanta, GA (US)

(*) Notice: Subject to any disclaimer, the term of this patent is extended or adjusted under 35 U.S.C. 154(b) by 69 days.

(21) Appl. No.: 16/157,754

(22) Filed: Oct. 11, 2018

(65) Prior Publication Data
US 2019/0039260 A1 Feb. 7, 2019

Related U.S. Application Data

(63) Continuation of application No. 14/275,833, filed on May 12, 2014, now Pat. No. 10,220,542.

(60) Provisional application No. 61/822,845, filed on May 13, 2013.

(51) Int. Cl.
*B28B 7/24* (2006.01)
*B28B 7/34* (2006.01)
*C04B 40/02* (2006.01)

(52) U.S. Cl.
CPC ............... *B28B 7/245* (2013.01); *B28B 7/34* (2013.01); *C04B 40/0254* (2013.01)

(58) Field of Classification Search
CPC .......... E04B 1/161; E04B 1/163; E04B 1/167; E04B 1/21; E04B 1/215; B28B 7/245; B28B 7/34; C04B 40/0254
See application file for complete search history.

(56) References Cited

U.S. PATENT DOCUMENTS

| 2,053,135 | A | 9/1936 | Dalton |
| 2,057,732 | A | 10/1936 | Navarre |
| 2,158,732 | A | 5/1939 | Shannon |
| 2,307,348 | A | 1/1943 | Anderson |
| 2,667,680 | A | 2/1954 | Sato |
| 3,022,196 | A | 2/1962 | Jenkins et al. |
| 3,144,701 | A | 8/1964 | Bowden |
| 3,163,911 | A | 1/1965 | Kenney |
| 3,199,828 | A | 8/1965 | Newton |

(Continued)

FOREIGN PATENT DOCUMENTS

| DE | 20205592 U1 | 7/2002 |
| EP | 0315323 | 5/1989 |

(Continued)

OTHER PUBLICATIONS

U.S. Appl. No. 16/404,718, filed May 6, 2019, first named inventor: Ciuperca.

(Continued)

*Primary Examiner* — James P Mackey
*Assistant Examiner* — Emmanuel S Luk
(74) *Attorney, Agent, or Firm* — Robert E. Richards; Richards IP Law

(57) ABSTRACT

The invention comprises a concrete form. The concrete form comprises a first mold for concrete and a second mold for concrete, the first and second molds being in thermal communication with each other. The concrete form also comprises thermal insulating material substantially surrounding the first and second molds but not between the first and second molds. A method of using the concrete form is also disclosed.

9 Claims, 11 Drawing Sheets

(56) References Cited

U.S. PATENT DOCUMENTS

| | | |
|---|---|---|
| 3,260,495 A | 7/1966 | Buyken |
| 3,381,929 A | 5/1968 | Bancker |
| 3,418,776 A | 12/1968 | Manderbach et al. |
| 3,435,573 A | 4/1969 | Krone |
| 3,596,351 A | 8/1971 | Tilton |
| 3,649,725 A | 3/1972 | Olson |
| 3,732,138 A | 5/1973 | Almog |
| 3,847,340 A | 11/1974 | Ficken et al. |
| 3,892,516 A | 7/1975 | McGrew et al. |
| 3,905,574 A | 9/1975 | Brauer |
| 3,919,143 A | 11/1975 | Morris |
| 3,962,841 A | 6/1976 | Carroll |
| 3,985,329 A | 10/1976 | Falk |
| 3,996,713 A | 12/1976 | Haeussler |
| 4,052,031 A | 10/1977 | Melfi |
| 4,059,936 A | 11/1977 | Lukens |
| 4,085,495 A | 4/1978 | Hebert |
| 4,090,336 A | 5/1978 | Carroll |
| 4,138,892 A | 2/1979 | Davis |
| 4,150,808 A | 4/1979 | Sawyer |
| 4,157,638 A | 6/1979 | Della-Donna |
| 4,191,521 A | 3/1980 | Muldery et al. |
| 4,211,385 A | 7/1980 | Johanson et al. |
| 4,221,097 A | 9/1980 | Dingler |
| 4,283,896 A | 8/1981 | Fricker et al. |
| 4,334,394 A | 6/1982 | Mäder |
| 4,349,398 A | 9/1982 | Kearns et al. |
| 4,351,873 A | 9/1982 | Davis |
| 4,370,840 A | 2/1983 | Bisbee et al. |
| 4,385,745 A | 5/1983 | Bennett |
| 4,394,529 A | 7/1983 | Gounder |
| 4,426,061 A | 1/1984 | Taggart |
| 4,462,949 A | 7/1984 | Fehlmann |
| 4,489,121 A | 12/1984 | Lukanuck |
| 4,516,372 A | 5/1985 | Grutsch |
| 4,534,924 A | 8/1985 | Kariakin |
| 4,553,729 A | 11/1985 | Connors |
| 4,585,685 A | 4/1986 | Forry et al. |
| 4,628,653 A | 12/1986 | Nash |
| 4,646,498 A | 3/1987 | Schneller et al. |
| 4,669,234 A | 6/1987 | Wilnau |
| 4,744,849 A | 5/1988 | Michaud-Soret |
| 4,765,109 A | 8/1988 | Boeshart |
| 4,784,902 A | 11/1988 | Crompton |
| 4,811,927 A | 3/1989 | Slonimsky et al. |
| 4,829,733 A | 5/1989 | Long |
| 4,832,308 A | 5/1989 | Slonimsky et al. |
| 4,841,702 A | 6/1989 | Huettemann |
| 4,866,897 A | 9/1989 | Yount |
| 4,885,888 A | 12/1989 | Young |
| 4,889,310 A | 12/1989 | Boeshart |
| 4,907,386 A | 3/1990 | Ekroth |
| 4,947,600 A | 8/1990 | Porter |
| 4,974,381 A | 12/1990 | Marks |
| 5,001,005 A | 3/1991 | Blanpied |
| 5,095,674 A | 3/1992 | Huettemann |
| 5,107,648 A | 4/1992 | Roby |
| 5,171,118 A | 12/1992 | Rothenbuhler |
| 5,217,339 A | 6/1993 | O'Connor et al. |
| 5,323,578 A | 6/1994 | Chagnon et al. |
| D357,855 S | 5/1995 | Keith et al. |
| 5,440,845 A | 8/1995 | Tadros et al. |
| 5,451,451 A | 9/1995 | Minnick |
| 5,464,680 A | 11/1995 | Hauser et al. |
| 5,493,837 A | 2/1996 | Hepler |
| 5,497,592 A | 3/1996 | Boeshart |
| 5,537,797 A | 7/1996 | Harkenrider et al. |
| 5,549,956 A | 8/1996 | Handwerker |
| 5,570,550 A | 11/1996 | Roby |
| 5,595,171 A | 1/1997 | Makin |
| 5,606,832 A | 3/1997 | Keith et al. |
| 5,611,182 A | 3/1997 | Spude |
| 5,624,491 A | 4/1997 | Liskowitz et al. |
| 5,707,179 A | 1/1998 | Bruckelmyer |
| 5,761,874 A | 6/1998 | Hayakawa |
| 5,765,318 A | 6/1998 | Michelson |
| 5,780,367 A | 7/1998 | Handwerker |
| 5,792,552 A | 8/1998 | Langkamp et al. |
| 5,809,723 A | 9/1998 | Keith et al. |
| 5,809,725 A | 9/1998 | Cretti |
| 5,809,726 A | 9/1998 | Spude |
| 5,809,728 A | 9/1998 | Tremelling |
| 5,836,126 A | 11/1998 | Harkenrider et al. |
| 5,836,715 A | 11/1998 | Hendrix et al. |
| 5,852,907 A | 12/1998 | Tobin et al. |
| 5,855,978 A | 1/1999 | Handwerker |
| 5,874,150 A | 2/1999 | Handwerker |
| 5,930,965 A | 8/1999 | Carver |
| 5,966,885 A | 10/1999 | Chatelain |
| 5,976,670 A | 11/1999 | Fugazzi |
| 5,992,114 A | 11/1999 | Zelinsky et al. |
| 5,996,297 A | 12/1999 | Keith et al. |
| 6,026,620 A | 2/2000 | Spude |
| 6,079,176 A | 6/2000 | Westra et al. |
| 6,086,349 A | 7/2000 | Del Monte |
| 6,088,985 A | 7/2000 | Clark |
| 6,123,879 A | 9/2000 | Hendrix et al. |
| 6,134,861 A | 10/2000 | Spude |
| 6,138,981 A | 10/2000 | Keith et al. |
| 6,230,462 B1 | 5/2001 | Beliveau |
| 6,234,736 B1 | 5/2001 | Miescher |
| 6,256,957 B1 | 7/2001 | Kelly |
| 6,263,629 B1 | 7/2001 | Brown, Jr. |
| 6,263,638 B1 | 7/2001 | Long, Sr. |
| 6,272,805 B1 | 8/2001 | Ritter et al. |
| 6,276,104 B1 | 8/2001 | Long, Sr. et al. |
| 6,279,285 B1 | 8/2001 | Kubica |
| 6,296,067 B1 | 9/2001 | Meendering |
| 6,296,224 B1 | 10/2001 | Hayakawa |
| 6,305,135 B1 | 10/2001 | Inaba |
| 6,314,694 B1 | 11/2001 | Cooper et al. |
| 6,318,040 B1 | 11/2001 | Moore, Jr. |
| 6,336,301 B1 | 1/2002 | Moore, Jr. |
| 6,360,505 B1 | 3/2002 | Johns |
| 6,412,245 B1 | 7/2002 | Lane et al. |
| 6,426,029 B1 | 7/2002 | Hiscock et al. |
| 6,454,889 B1 | 9/2002 | Hendrix et al. |
| 6,609,340 B2 | 8/2003 | Moore, Jr. et al. |
| 6,612,083 B1 | 9/2003 | Richards |
| 6,632,309 B1 | 10/2003 | Hendrix et al. |
| 6,647,686 B2 | 11/2003 | Dunn et al. |
| 6,688,066 B1 | 2/2004 | Cottier et al. |
| 6,705,055 B2 | 3/2004 | Ritter et al. |
| 6,711,862 B1 | 3/2004 | Long |
| 6,725,616 B1 | 4/2004 | Pease |
| 6,729,090 B2 | 5/2004 | Messenger et al. |
| 6,761,007 B2 | 7/2004 | Lancelot, III et al. |
| 6,817,150 B1 | 11/2004 | Boeshart |
| 6,818,058 B2 | 11/2004 | Ronin |
| 6,874,749 B2 | 4/2005 | Wells |
| 6,898,908 B2 | 5/2005 | Messenger et al. |
| 6,898,912 B2 | 5/2005 | Bravinski |
| 6,915,613 B2 | 7/2005 | Wostal et al. |
| 6,935,081 B2 | 8/2005 | Dunn et al. |
| 6,945,506 B2 | 9/2005 | Long, Sr. |
| 6,948,289 B2 | 9/2005 | Bravinski |
| 7,000,359 B2 | 2/2006 | Meyer |
| 7,100,336 B2 | 9/2006 | Messenger et al. |
| 7,124,547 B2 | 10/2006 | Bravinski |
| 7,138,346 B2 | 11/2006 | Bush et al. |
| 7,148,160 B2 | 12/2006 | Porter |
| 7,183,524 B2 | 2/2007 | Naylor et al. |
| 7,206,726 B2 | 4/2007 | Seeber et al. |
| 7,230,213 B2 | 6/2007 | Naylor et al. |
| 7,368,150 B2 | 5/2008 | Pritchett |
| 7,398,131 B2 | 7/2008 | Trost et al. |
| 7,409,800 B2 | 8/2008 | Budge |
| 7,491,268 B2 | 2/2009 | Hoffis |
| 7,523,591 B2 | 4/2009 | Di Lorenzo |
| 7,617,640 B2 | 11/2009 | Bradley |
| 7,625,827 B2 | 12/2009 | Egan et al. |
| 7,765,761 B2 | 8/2010 | Paradis |
| 7,818,935 B2 | 10/2010 | Velickovic |
| 7,846,278 B2 | 12/2010 | Porter |

(56) References Cited

U.S. PATENT DOCUMENTS

| | | |
|---|---|---|
| 7,867,927 B2 | 1/2011 | Bush et al. |
| 7,871,055 B1 | 1/2011 | Dagher et al. |
| 7,934,693 B2 | 5/2011 | Bravinski |
| 7,984,591 B2 | 7/2011 | Cashin et al. |
| 8,032,244 B2 | 10/2011 | Trost et al. |
| 8,181,580 B2 | 5/2012 | Roth et al. |
| 8,277,931 B1 | 10/2012 | Kumar |
| 8,322,600 B2 | 12/2012 | Vitt |
| 8,532,815 B1 | 9/2013 | Ciuperca |
| 8,545,749 B2 | 10/2013 | Ciuperca |
| 8,555,583 B2 | 10/2013 | Ciuperca |
| 8,555,584 B2 | 10/2013 | Ciuperca |
| 8,636,941 B1 | 1/2014 | Ciuperca |
| 8,745,943 B2 | 6/2014 | Ciuperca |
| 8,754,143 B2 | 6/2014 | Delaviz et al. |
| 8,756,890 B2 | 6/2014 | Ciuperca |
| 8,844,227 B1 | 9/2014 | Ciuperca |
| 8,855,803 B2 | 10/2014 | Ciuperca |
| 8,877,329 B2 | 11/2014 | Ciuperca |
| 8,950,137 B2 | 2/2015 | Ciuperca |
| 8,951,460 B2 | 2/2015 | Ciuperca |
| 8,966,845 B1 | 3/2015 | Ciuperca |
| 8,969,222 B2 | 3/2015 | Keese et al. |
| 9,003,740 B2 | 4/2015 | Ciuperca |
| 9,017,495 B2 | 4/2015 | Porter |
| 9,074,379 B2 | 7/2015 | Ciuperca |
| 9,114,549 B2 | 8/2015 | Ciuperca |
| 9,115,503 B2 | 8/2015 | Ciuperca |
| 9,145,695 B2 | 9/2015 | Ciuperca |
| 9,181,699 B2 | 11/2015 | Ciuperca |
| 9,290,939 B2 | 3/2016 | Ciuperca |
| 9,366,023 B2 | 6/2016 | Ciuperca |
| 9,458,637 B2 | 10/2016 | Ciuperca |
| 9,505,657 B2 | 11/2016 | Ciuperca |
| 9,574,341 B2 | 2/2017 | Ciuperca |
| 9,624,679 B2 | 4/2017 | Ciuperca |
| 9,745,749 B2 | 8/2017 | Ciuperca |
| 9,776,920 B2 | 10/2017 | Ciuperca |
| 9,809,981 B2 | 11/2017 | Ciuperca |
| 9,822,037 B1 | 11/2017 | Ciuperca |
| 9,828,289 B1 | 11/2017 | Ciuperca |
| 9,982,445 B2 | 5/2018 | Ciuperca |
| 10,047,005 B1 | 8/2018 | Ciuperca |
| 10,047,006 B1 | 8/2018 | Ciuperca |
| 10,059,628 B2 | 8/2018 | Ciuperca |
| 10,065,339 B2 | 9/2018 | Ciuperca |
| 10,065,886 B1 | 9/2018 | Ciuperca |
| 10,071,503 B2 | 9/2018 | Ciuperca |
| 10,166,697 B2 | 1/2019 | Ciuperca |
| 10,167,629 B2 | 1/2019 | Ciuperca |
| 10,220,542 B2 | 3/2019 | Ciuperca |
| 10,280,622 B2 | 5/2019 | Ciuperca |
| 2002/0005725 A1 | 1/2002 | Scott |
| 2002/0014048 A1 | 2/2002 | Meendering |
| 2002/0017070 A1 | 2/2002 | Batch |
| 2002/0092253 A1 | 7/2002 | Beliveau |
| 2003/0115831 A1 | 6/2003 | Long, Sr. |
| 2003/0170093 A1 | 9/2003 | Janeway |
| 2003/0192272 A1 | 10/2003 | Bravinsky |
| 2004/0020147 A1 | 2/2004 | Martella et al. |
| 2004/0040239 A1 | 3/2004 | Baillargeon |
| 2004/0129857 A1 | 7/2004 | Musk et al. |
| 2004/0177580 A1 | 9/2004 | Tremelling |
| 2004/0252745 A1 | 12/2004 | Park et al. |
| 2005/0086904 A1 | 4/2005 | Foley |
| 2005/0102968 A1 | 5/2005 | Long, Sr. et al. |
| 2005/0108985 A1 | 5/2005 | Bravinski |
| 2006/0080923 A1 | 4/2006 | Fleischhacker |
| 2006/0179787 A1 | 8/2006 | Bilowol |
| 2007/0062143 A1 | 3/2007 | Noushad |
| 2007/0094974 A1 | 3/2007 | Velickovic |
| 2007/0095255 A1 | 5/2007 | Abbate et al. |
| 2007/0144110 A1 | 6/2007 | Aalbers et al. |
| 2007/0144653 A1 | 6/2007 | Padilla et al. |
| 2007/0231576 A1 | 10/2007 | Davis et al. |
| 2008/0041004 A1 | 2/2008 | Gibbar et al. |
| 2008/0173788 A1 | 7/2008 | Brewka et al. |
| 2008/0221815 A1 | 9/2008 | Trost et al. |
| 2008/0313991 A1 | 12/2008 | Chouinard |
| 2009/0000241 A1 | 1/2009 | Long, Sr. |
| 2009/0173870 A1 | 7/2009 | Long, Sr. |
| 2009/0202307 A1 | 8/2009 | Au et al. |
| 2009/0218474 A1 | 9/2009 | Bowman |
| 2009/0229214 A1 | 9/2009 | Nelson |
| 2009/0277103 A1 | 11/2009 | De Jaham |
| 2010/0050553 A1 | 3/2010 | Schofield |
| 2010/0062667 A1 | 3/2010 | Pan et al. |
| 2010/0090089 A1 | 4/2010 | Koegel |
| 2010/0162659 A1 | 7/2010 | Laprise |
| 2010/0192498 A1 | 8/2010 | Gleckman |
| 2010/0212552 A1 | 8/2010 | Stratton et al. |
| 2010/0232877 A1 | 9/2010 | Sanvik et al. |
| 2010/0255277 A1 | 10/2010 | Platt et al. |
| 2010/0319295 A1 | 12/2010 | Nelson |
| 2011/0008629 A1 | 1/2011 | Davidson et al. |
| 2011/0057090 A1 | 3/2011 | Spude et al. |
| 2011/0061329 A1 | 3/2011 | Tadros et al. |
| 2011/0131892 A1 | 6/2011 | Del Pino |
| 2011/0218261 A1 | 9/2011 | Loh et al. |
| 2011/0239566 A1 | 10/2011 | Ciuperca |
| 2012/0058299 A1 | 3/2012 | Serwin |
| 2012/0097073 A1 | 4/2012 | Lambrechts |
| 2013/0074432 A1 | 3/2013 | Ciuperca |
| 2013/0074433 A1 | 3/2013 | Ciuperca |
| 2013/0119576 A1 | 5/2013 | Ciuperca |
| 2013/0280477 A1 | 10/2013 | Davis et al. |
| 2013/0337709 A1 | 12/2013 | Paradis et al. |
| 2013/0343734 A1 | 12/2013 | Dock, II et al. |
| 2014/0041329 A1 | 2/2014 | Ciuperca |
| 2014/0083333 A1 | 3/2014 | Ciuperca |
| 2014/0084132 A1 | 3/2014 | Ciuperca |
| 2014/0087158 A1 | 3/2014 | Ciuperca |
| 2014/0088756 A1 | 3/2014 | Ciuperca |
| 2014/0174647 A1 | 6/2014 | Ciuperca |
| 2014/0212643 A1 | 7/2014 | Ciuperca |
| 2014/0260034 A1 | 7/2014 | Ciuperca |
| 2014/0263942 A1 | 9/2014 | Ciuperca |
| 2014/0272302 A1 | 9/2014 | Ciuperca |
| 2014/0290165 A1 | 10/2014 | Spanton et al. |
| 2014/0333004 A1 | 11/2014 | Ciuperca |
| 2014/0333010 A1 | 11/2014 | Ciuperca |
| 2015/0007524 A1 | 1/2015 | Ciuperca |
| 2015/0014300 A1 | 1/2015 | Ciuperca |
| 2015/0069647 A1 | 3/2015 | Ciuperca |
| 2015/0069664 A1 | 3/2015 | Ciuperca |
| 2015/0266783 A1 | 9/2015 | Ciuperca |

FOREIGN PATENT DOCUMENTS

| | | |
|---|---|---|
| EP | 2065530 A2 | 6/2009 |
| JP | 7224478 | 8/1995 |
| JP | H11256734 | 9/1999 |
| JP | H11350732 A | 12/1999 |
| JP | 2000240214 A | 9/2000 |
| JP | 2002128559 | 5/2002 |
| WO | WO99/18302 A1 | 4/1994 |
| WO | WO2005/113228 A1 | 12/2005 |
| WO | WO2009/072795 A1 | 6/2009 |
| WO | WO2011/141400 | 11/2011 |
| WO | WO 2012/080323 | 6/2012 |
| WO | WO 2012/080326 | 6/2012 |

OTHER PUBLICATIONS

U.S. Appl. No. 15/218,729, filed Jul. 25, 2016, first named inventor: Ciuperca.

U.S. Appl. No. 15/180,002, filed Jun. 11, 2016, first named inventor: Ciuperca.

U.S. Appl. No. 15/708,436, filed Sep. 19, 2017, first named inventor: Ciuperca.

U.S. Appl. No. 15/168,133, filed May 30, 2016, first named inventor: Ciuperca.

(56) References Cited

OTHER PUBLICATIONS

U.S. Appl. No. 14/734,184, filed Jun. 9, 2015, first named inventor: Ciuperca.
U.S. Appl. No. 15/864,159, filed Jan. 8, 2018, first named inventor: Ciuperca.
U.S. Appl. No. 15/709,109, filed Sep. 19, 2017, first named inventor: Ciuperca.
U.S. Appl. No. 15/671,798, filed Aug. 8, 2017, first named inventor: Ciuperca.
U.S. Appl. No. 15/990,759, filed May 28, 2018, first named inventor: Ciuperca.
U.S. Appl. No. 16/126,068, filed Sep. 10, 2018, first named inventor: Ciuperca.
U.S. Appl. No. 15/804,701, filed Nov. 6, 2017, first named inventor: Ciuperca.

INSULATED CONCRETE BATTERY MOLD, INSULATED PASSIVE CONCRETE CURING SYSTEM, ACCELERATED CONCRETE CURING APPARATUS AND METHOD OF USING SAME

CROSS-REFERENCE TO RELATED APPLICATIONS

The present application is a continuation of application Ser. No. 14/275,833 filed May 12, 2014, which claims the benefit of the filing date of U.S. provisional patent application Ser. No. 61/822,845 filed May 13, 2013.

FIELD OF THE INVENTION

The present invention relates to a concrete mold. More specifically, the present invention relates to an insulated concrete battery mold. The present invention also relates to an accelerated concrete curing apparatus and a method of using the same. The present invention also relates to a method of using an insulated concrete battery mold. The present invention also relates to a passive concrete curing system.

BACKGROUND OF THE INVENTION

Concrete battery molds are known in the art and come in a variety of sizes, designs and configurations. Battery molds are used for vertical casting of concrete panels or other concrete elements. A common element of all concrete battery molds is that they include a plurality of movable vertical rectangular mold halves or leaves that either hang from top rails and/or are supported on the bottom by rails or casters or both. The mold halves are closed for filling with concrete and are spread apart for stripping the cured concrete from the mold. State of the art battery molds allow for casting multiple concrete elements, such as slabs or walls, at the same time on a relatively small foot print. Generally, battery molds are used in precast concrete plants. In order to shorten production time and increase production capacity, precast plants pour and strip molds on a relatively short schedule. To achieve such a fast turn around, concrete precast plants use relatively large amounts of portland cement in the concrete elements. The stresses associated with demolding and moving concrete elements around the concrete plant within a few hours of pouring typically requires concrete mixes that use 900 lbs/yd$^3$ of portland cement. By using such relatively large amounts of cement, a relatively large amount of heat is generated, which allows the concrete to set and gain strength in a relatively short amount of time. By comparison, similar onsite cast-in-place concrete elements may only require 450 lbs/yd$^3$ of portland cement.

To withstand the pressure of concrete, battery mold leaves typically are made of metal, such as steel. Such the battery mold frames, leaves, halves or leaflets are highly heat conductive. Since a plurality of these elements filled with concrete are pushed together in thermal contact with each other, the battery mold acts somewhat like a mass concrete pour. The sum of all concrete slabs contained in the battery molds are in direct contact with each other through the heat conductive battery mold parts. The heat of hydration from one panel multiplied by the number of panels will significantly increase the internal temperature of the concrete slabs. In order to keep the concrete from achieving an unsafe temperature, battery molds limit the number of slabs in direct thermal contact. Once the concrete elements are stripped from the battery mold, they are moved to a curing room where steam and heat is used to complete the concrete curing.

Therefore, the precast concrete mixes used in a typical precast plant and battery mold is relatively expensive. Concrete used in a precast plant typically does not use any supplementary cementitious material, such as fly ash or slag cement. In addition there are significant drawbacks associated with using relatively large amounts of portland cement in a concrete mix. Portland cement concrete achieves 90% of maximum strength under ideal curing conditions in approximately 28 days. The more portland cement that is used in a concrete mix, the more brittle the concrete becomes. Precast plants use substantial pretensioned reinforcement (cables) to address brittleness of the concrete. In addition, the more portland cement that is used in a concrete mix, the more calcium hydroxide is generated, which makes the concrete susceptible to sulfate attack. However concrete made with fly ash and other pozzolanic materials are denser, less permeable and more resistant to sulfate attack.

Just like any other types of molds and concrete forming systems, prior art battery molds are only used to form and cast concrete. Battery molds are not used to cure concrete. In U.S. Pat. Nos. 8,545,749; 8,626,941 and 8,555,584, applicant has discovered that concrete forms can accelerate concrete curing when retaining the heat of hydration within the concrete form. The curing of concrete needs two basic elements, heat and water, to fully hydrate the cementitious material. The curing of plastic concrete is an exothermic process. This heat is produced by the hydration of the portland cement, or other pozzolanic or cementitious materials, that make up the concrete. Initially, the hydration process produces a relatively large amount of heat. When retaining the heat of hydration within an insulated concrete form, less portland cement per cubic yard can be used in order to achieve the same results. Since a battery mold contains a plurality of concrete elements that can be formed in direct thermal contact with each other, as a part of the present invention the cumulative energy of the heat of hydration of all panels can be used to further accelerate concrete curing, provided the battery mold is insulated in accordance with the present invention to retain the heat of hydration.

Portland cement manufacture causes environmental impacts at all stages of the process. During manufacture, a metric ton of $CO_2$ is released for every metric ton of portland cement made. Worldwide $CO_2$ emissions from portland cement manufacture amount to about 5-7% of total $CO_2$ emissions. The average energy input required to make one ton of portland cement is about 4.7 million Btu—the equivalent of about 418 pounds of coal. The production of portland cement is energy intensive, accounting for 2% of primary energy consumption globally. In 2010 the world production of hydraulic cement was 3,300 million tons.

Concrete can also be made with slag cement ("SC") and fly ash ("FA") but are not frequently used. Slag cement and fly ash generate relatively low amounts of heat of hydration, which result in extremely slow concrete setting time and strength gain. Slag cement and fly ash can be mixed with portland cement but industry practice in building construction limits use of slag cement and fly ash to no more than 30% replacement of portland cement and only during warm weather conditions. Concrete made with slag cement and fly ash may take up to 90 days to achieve 80-90% of maximum strength. Mass concrete structures use more slag cement and fly ash, replacing up to 80% of portland cement, as a means to reduce the heat of hydration to reduce cracking. Slag cement and fly ash use less water to hydrate, may have finer particles than portland cement and produce concretes that achieve higher compressive and flexural strength. Such concrete is also less permeable, and, therefore, structures built with slag cement and fly ash have far longer service lives.

Slag cement is obtained by quenching molten iron slag (a by-product of iron and steel-making) from a blast furnace in water or steam, to produce a glassy, granular product that is then dried and ground into a fine powder. Slag cement manufacture uses only 15% of the energy needed to make portland cement. Since slag cement is made from a waste materials; no virgin materials are required and the amount of landfill space otherwise used for disposal is reduced. For each metric ton of pig iron produced, approximately ⅓ metric ton of slag is produced. In 2009, worldwide pig iron production was 1.211 billion tons. There was an estimated 400 million tons of slag produced that could potentially be made into slag cement. However, only a relatively small percentage of slag is used to make slag cement in the USA.

Fly ash is a by-product of the combustion of pulverized coal in electric power generation plants. When pulverized coal is ignited in a combustion chamber, the carbon and volatile materials are burned off. However, some of the mineral impurities of clay, shale, feldspars, etc. are fused in suspension and carried out of the combustion chamber in the exhaust gases. As the exhaust gases cool, the fused materials solidify into spherical glassy particles called fly ash. The quantity of fly ash produced is growing along with the steady global increase in coal use. According to Obada Kayali, a civil engineer at the University of New South Wales Australian Defense Force Academy, only 9% of the 600 million tons of fly ash produced worldwide in 2000 was recycled and even smaller amount used in concrete; most of the rest is disposed of in landfills. Since fly ash is a waste product, no additional energy is required to make it.

Historically, concrete has also been made using natural cements and other pozzolanic materials, such as volcanic ash, certain type of reactive clays, rice husk ash, metakolin, silica fumes and others. Pozzolanic materials have a relatively low rate of hydration thereby producing significantly less heat of hydration. Therefore concrete made with pozzolanic materials are seldom, if ever, used with current state of the art battery molds.

More recently pozzolanic materials, such a fly ash and volcanic ash have been modified through a process of fracturing which produces what is called "energetically modified cement." Such pozzolanic materials are typically of a generally spherical shape but can be fractured so that the round sphere particle is broken up into multiple particles with more surface contact area. The greater surface contact area creates a higher reactive particle, therefore increasing the hydration properties of the pozzolanic material.

The present invention is applicable to all battery mold designs. To provide the present invention, a battery mold is enclosed on the top, bottom and all four sides by insulating material. The insulating material has sufficient insulating properties to retain a significant amount of the heat of hydration produced by the curing concrete cast within the molds of the battery mold. By retaining the heat of hydration, the curing of the concrete is accelerated and also produces concrete having improved physical properties. A battery mold in accordance with the present invention can be made portable and set up at a construction site. Since the battery mold is insulated, it can also be use to accelerate concrete curing regardless of the ambient temperature, such as in cold weather.

SUMMARY OF THE INVENTION

The present invention satisfies the foregoing needs by providing an improved concrete forming system to retain the heat of hydration of curing concrete. The present invention also satisfies the foregoing needs by providing an insulated concrete curing system that allows for gradual heat loss of the concrete after the concrete elements have been removed from the concrete mold.

In one disclosed embodiment, the present invention comprises a concrete form. The form comprises a first mold for concrete and a second mold for concrete, the first and second molds are in thermal communication with each other. The form also comprises thermal insulating material substantially surrounding the first and second molds but not between the first and second molds.

In another disclosed embodiment, the present invention comprises a method. The method comprises placing plastic concrete in a first and second concrete mold, wherein the first and second molds are in thermal communication with each other. The form also comprises thermal insulating material substantially surrounding the first and second molds but not between the first and second molds. The form also comprises thermal insulating material substantially surrounding the first and second molds but not between the first and second molds. The concrete is allowed to at least partially cure within the first and second molds.

In another disclosed embodiment, the present invention comprises a method. The method comprises placing a plurality of partially cured concrete slabs or objects in an insulated enclosure and allowing the partially cured concrete slabs or objects to further cure within the insulated enclosure.

Therefore, it is an object of the present invention to provide an improved insulated concrete form.

Another object of the present invention is to provide an improved battery mold for concrete.

Another object of the present invention is to provide an insulated battery mold for concrete.

A further object of the present invention is to provide a method of curing concrete by retaining the heat of hydration within the concrete thereby accelerating the hydration and curing of cementitious materials to achieve concrete with improved properties.

Another object of the present invention is to provide an improved method for curing concrete by more fully hydrating the cementitious material before heat and moisture are lost to the environment.

Another object of the present invention is to provide a system for curing concrete such that the concrete develops its maximum strength as early as possible.

A further object of the present invention is to provide a concrete curing system that uses reduced amounts of portland cement while producing concrete having an ultimate strength equivalent to concrete made with conventional amounts of portland cement.

Another object of the present invention is to provide a concrete curing system that substantially reduces the use of portland cement while producing concrete having an ultimate strength equivalent to concrete made with conventional amounts of portland cement.

A further object of the present invention is to provide a concrete curing system that allows the use of concrete mixes with relatively large amounts of recycled industrial waste material, such as slag cement, fly ash, silica fume, pulverized glass and/or rice husk ash, while producing concrete having an ultimate strength equivalent to, or better than, concrete made with conventional amounts of portland cement.

A further object of the present invention is to provide a concrete curing system that uses inert or filler material, such as ground limestone, calcium carbonate, titanium dioxide, or quartz, while producing concrete having an ultimate strength equivalent to, or better than, concrete made with conventional amounts of portland cement.

Another object of the present invention is to provide a concrete curing systems that allows the use of concrete mixes using relatively high percentages of supplementary cementitious materials, such as pozzolanic materials.

A further object of the present invention is to provide a concrete curing system that uses relatively large amounts of recycled industrial waste material, such as slag cement, fly ash, silica fume, pulverized glass and/or rice husk ash, in combination with inert or filler material, such as ground limestone, calcium carbonate, titanium dioxide, or quartz, while producing concrete having an ultimate strength equivalent to, or better than, concrete made with conventional amounts of portland cement.

Another object of the present invention is to provide a system for curing concrete such that concrete mixes containing reduced amounts of portland cement can be cured efficiently and effectively therein while having compressive strengths equivalent to, or better than, conventional concrete mixes.

Yet another object of the present invention is to provide a system for curing concrete such that the concrete develops its maximum durability.

Another object of the present invention is to provide a system for curing concrete more quickly.

A further object of the present invention is to provide a system for curing concrete that reduces or eliminates temperature shrinkage cracking.

Another object of the present invention is to provide an insulated concrete form that provides insulation for conductive heat loss.

Another object of the present invention is to provide a system for further curing partially cured concrete slabs or objects.

Yet another object of the present invention is to provide an insulated curing enclosure for further curing partially cured concrete slab or objects.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
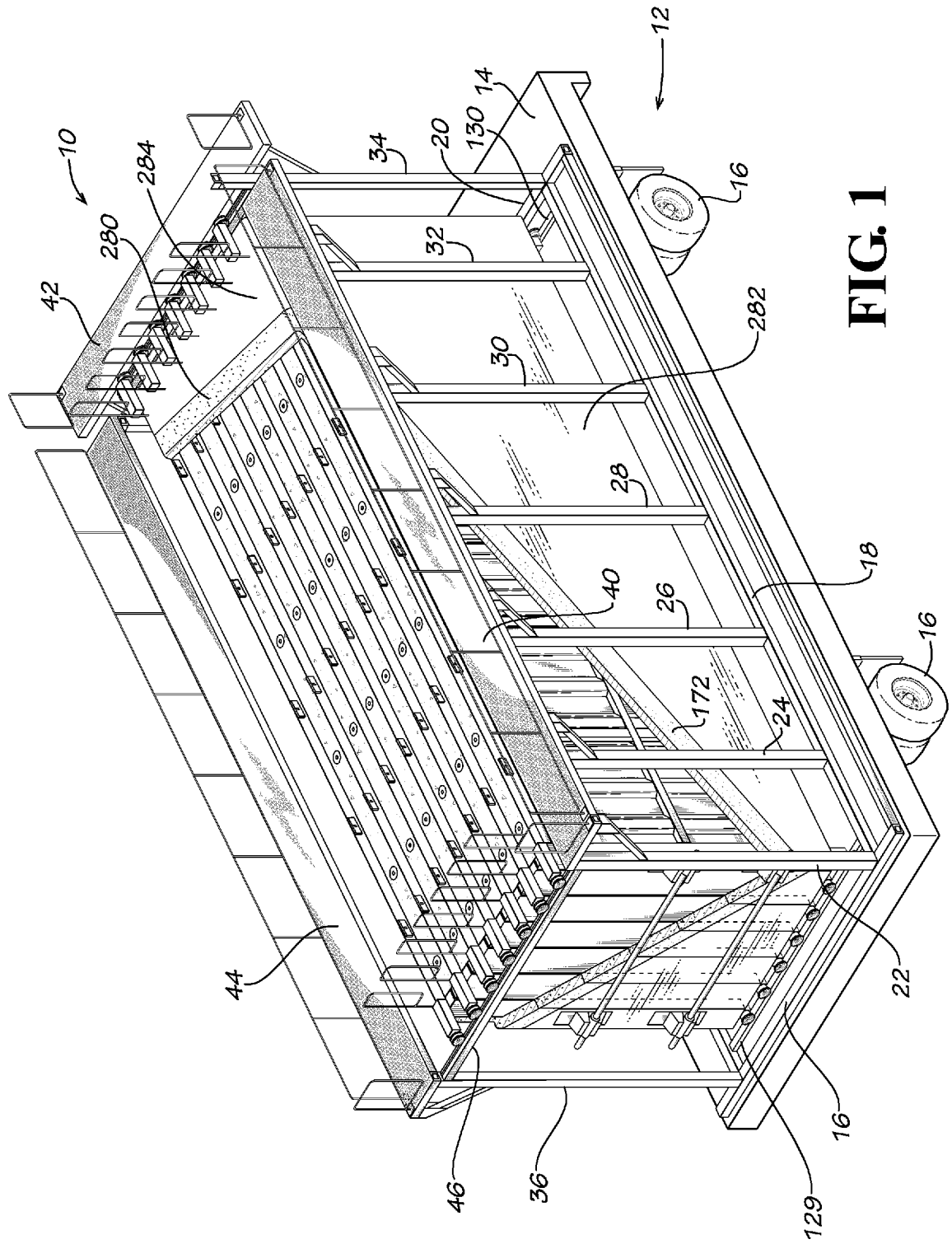
FIG. 1 is a perspective view of a disclosed embodiment of an insulated concrete battery mold in accordance with the present invention.
Figure 2:
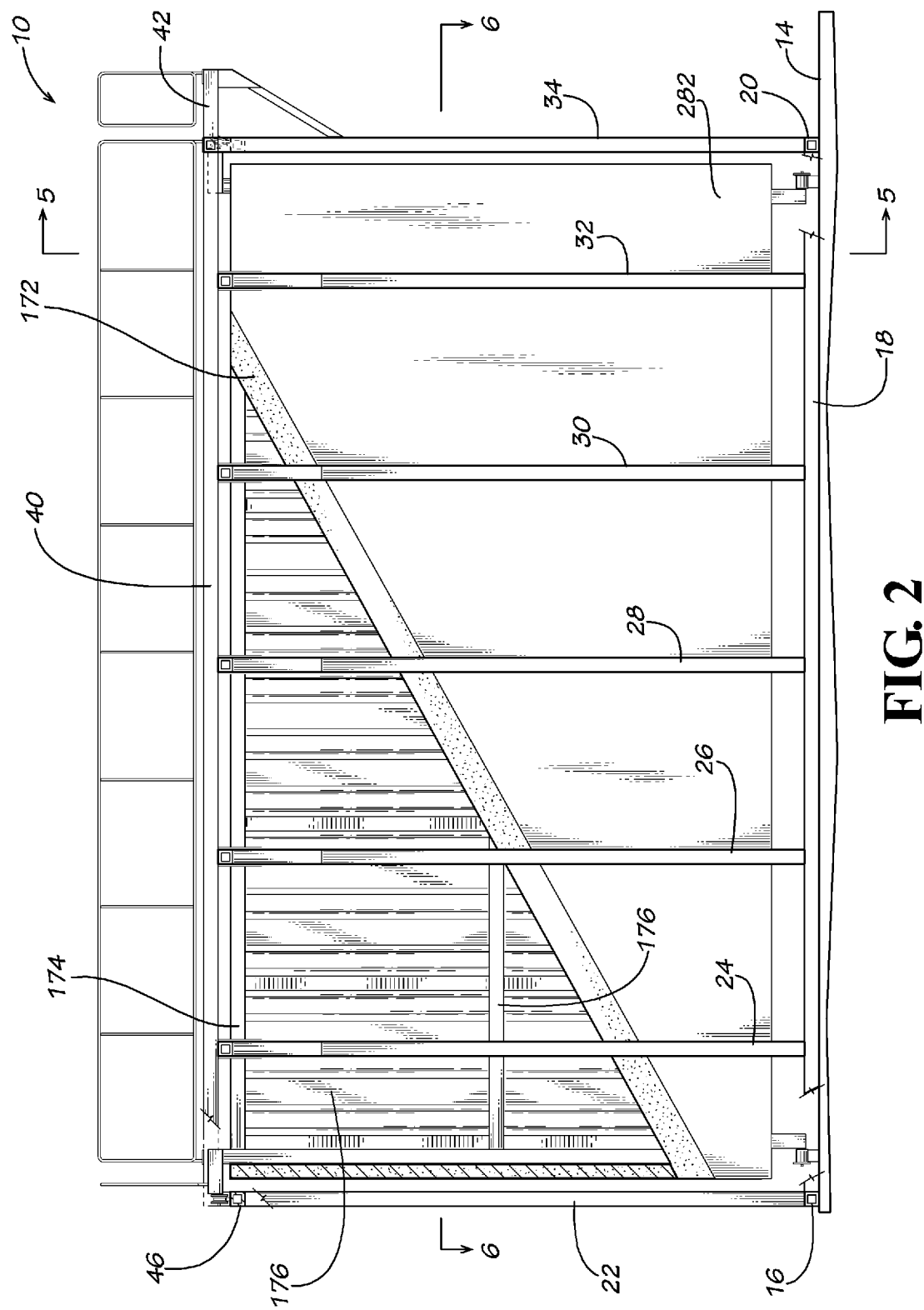
FIG. 2 is a side view of the insulated concrete battery mold shown in FIG. 1.
Figure 3:
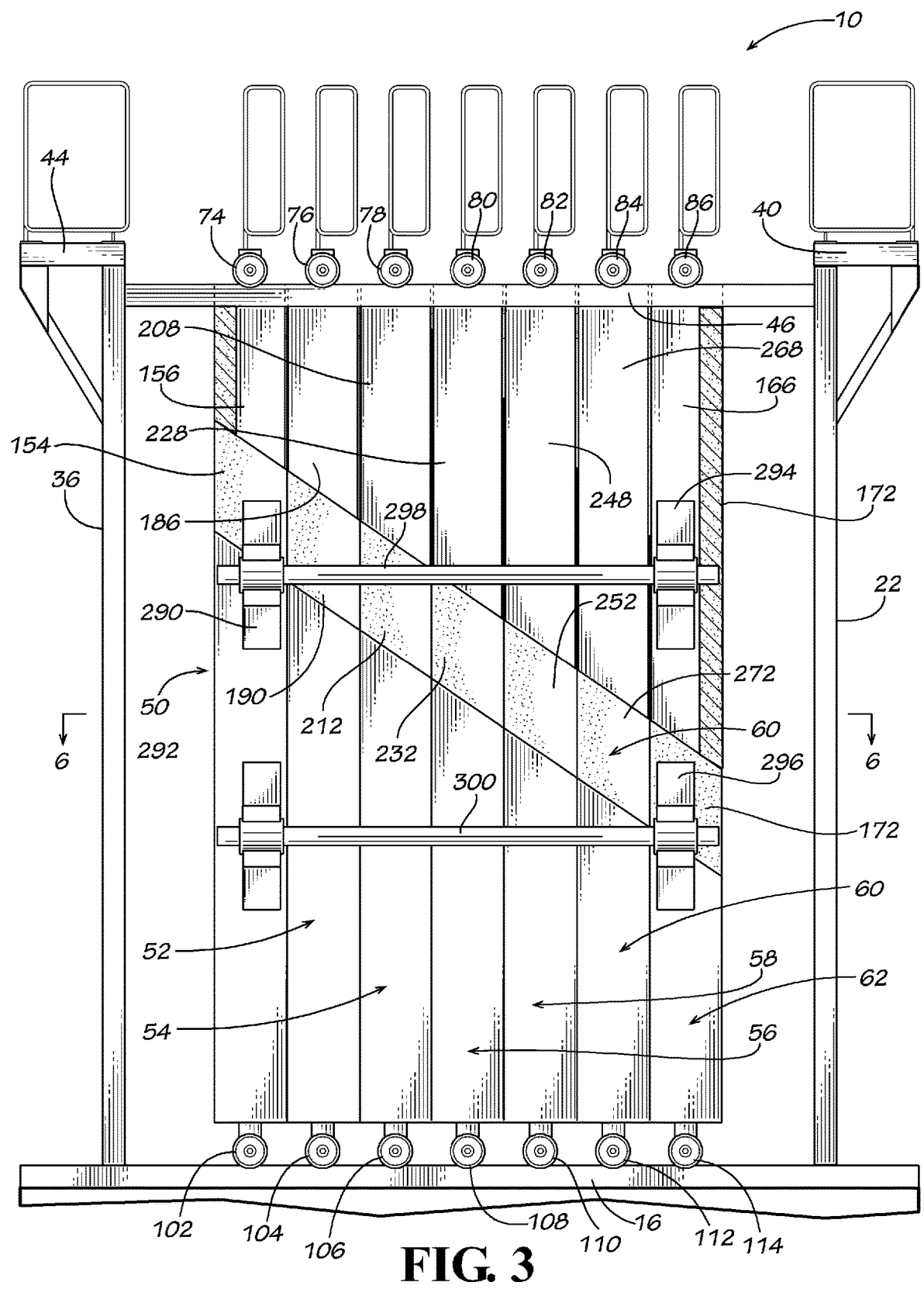
FIG. 3 is an end view of the insulated concrete battery mold shown in FIG. 1.

With reference to the drawing, in which like numbers indicate like elements throughout the several views, it is seen that there is a disclosed embodiment of an insulated concrete battery mold 10 in accordance with the present invention. The insulated concrete battery mold 10 optionally can be mounted on a trailer 12 for portability. The trailer 12 comprises a flat bed 14 and wheels 16, 18. The trailer 12 allows the insulated concrete battery mold 10 to be transported to a job site, such as where a building or a roadway is being constructed. By being able to cast concrete panels onsite, the insulated concrete battery mold 10 of the present invention eliminates the need to transport precast concrete panels long distances from a precast concrete plant to a job site.

The insulated concrete battery mold 10 comprises a horizontal rectangular support frame 16, 18, 20 (only three of the four support members are shown) and a plurality of vertical support members 22, 24, 26, 28, 30, 32, 34, 36, 38 (only some of which are shown). The frame 16-20 and support members 22-38 are made from steel tubing or any other suitable material or shape. The vertical support members 22-38 support the walkways 40, 42, 44 disposed at the top of the insulated battery mold. The support members 22, 36 also support a rail 46 disposed at one end of the insulated concrete battery mold 10 and the support members 34, 38 support another rail 48 disposed at the opposite end of the insulated concrete battery mold.

Disposed within the insulated concrete battery mold 10 are plurality of mold halves or leaves 50, 52, 64, 56, 58, 60, 62. Attached to the top of one end of each mold leaflet 50-62 is a roller 74, 76, 78, 80, 82, 84, 86, respectively. Attached to the top of the other end of each mold leaflet 50-62 is a roller 88, 89, 90, 92, 94, 96, 98, 100, respectively. The rollers 74-86 ride on the rail 46; the rollers 88-100 ride on the rail 48. Attached to the bottom of one end of each mold leaflet 50-62 is a caster 102, 104, 106, 108, 110, 112, 114, respectively. Attached to the bottom of the other end of each mold leaflet is a caster 116, 118, 120, 122, 124, 126, 128, respectively. The casters 102-114 ride on a rail 129; the casters 116-128 ride on a rail 130. The rollers 74-86 and 88-100 and the casters 102-114 and 116-128 allow each of the mold leaves 50-62 to move laterally on the rails 46, 48 and frame members 16, 20 independently of the other mold leaves. The rollers 74-86 and 88-100 and the casters 102-114 and 116-128 also support the weight of the mold leaves 50-62 and any concrete that fills those mold leaves. Although the present invention contemplate the use of rails and rollers both at the top and bottom of the mold, any configuration with rollers only at the top or bottom of the mold can be used.

The mold leaflet 50 comprises a mold face plate 131 preferably made from steel or aluminum. The mold face plate 131 is designed to contact plastic concrete that fills the mold leaves 50-62 and forms one of the surfaces of the concrete panel cast therein. Attached to the back side; i.e., the side that does not contact the plastic concrete, of the mold face plate 131 is a frame that stiffens the mold face plate against deflection or deformation by the weight of plastic concrete placed in the mold leaves 50-62. This frame comprise three horizontal steel tubes 132, 134, 136 and a plurality of vertical steel tubes 138, 140, 142, 144, 146, 148, 150. Attached to the horizontal steel tubes 132-136 and the vertical steel tubes 138-150 is a corrugated panel 152 preferably made of steel. Disposed on the outer surface of the corrugated panel 152 is a layer of insulating material 154. The opposite ends of the mold leaflet 50 are defined by two end plates 156, 158 preferably also made of steel. The layer of insulating material 154 wraps around the corners of the leaflet mold 50 and covers the end plates 156, 158. The bottom of the mold leaflet 50 is defined by a bottom plate 160. The layer of insulating material 154 wraps around the bottom of the mold leaflet 50 and covers the bottom plate 160.

The mold leaflet 62 is constructed identically to the mold leaflet 50, except that it is a mirror image thereof. Therefore, the details of the construction of the mold leaflet 62 will not be described further, except as follows. The mold leaflet 62 includes a mold face plate 162; a corrugated plate 164; two end plates 166, 168; a bottom plate 170 and a layer of insulating material 172. The mold leaflet 62 also includes a top horizontal steel tube 174 and a middle horizontal steel tube 176. The mold leaves 50, 62 are single-sided molds.

The mold leaflet 52 is a double-sided mold. The mold leaflet 50 includes two mold face plates 178, 180. The mold face plates 178, 180 are designed to contact plastic concrete that fills the mold leaves 50-62 and forms one of the surfaces of two separate concrete panels cast therein. Disposed between the mold face plates 178, 180 is a steel frame that stiffens the mold face plates against deflection or deformation by the weight of plastic concrete placed in the mold leaves 50-62. The frame comprises three horizontal steel tubes and a plurality of vertical steel tubes of the same design as used for the leaflet 50 and includes a top horizontal steel tube 182 and a vertical steel tube 184. The opposite ends of the mold leaflet 52 are defined by two end plates 186, 188 preferably also made of steel. Each of the end plates 186, 188 is covered by a layer of insulation 190, 192, respectively. The bottom of the mold leaflet 52 is defined by a bottom plate 194. The bottom plate 194 is covered by a layer of insulating material 196.

The mold leaves 54, 56, 58, 60 are each constructed identically to the mold leaflet 52. The mold leaflet 54 includes two mold face plates 200, 202. Disposed between the mold face plates 200, 202 is a steel frame that stiffens the mold face plates against deflection or deformation by the weight of plastic concrete placed in the mold leaves 50-62. The frame comprises three horizontal steel tubes and a plurality of vertical steel tubes of the same design as used for the leaflet 52 and includes a top horizontal steel tube 204 and a vertical steel tube 206. The opposite ends of the mold leaflet 54 are defined by two end plates 208, 210 preferably also made of steel. Each of the end plates 208, 210 is covered by a layer of insulation 212, 214, respectively. The bottom of the mold leaflet 54 is defined by a bottom plate 216. The bottom plate 216 is covered by a layer of insulating material 218.

The mold leaflet 56 includes two mold face plates 220, 222. Disposed between the mold face plates 220, 222 is a steel frame that stiffens the mold face plates against deflection or deformation by the weight of plastic concrete placed in the mold leaves 50-62. The frame comprises three horizontal steel tubes and a plurality of vertical steel tubes of the same design as used for the leaflet 52 and includes a top horizontal steel tube 224 and a vertical steel tube 226. The opposite ends of the mold leaflet 56 are defined by two end plates 228, 230 preferably also made of steel. Each of the end plates 228, 230 is covered by a layer of insulation 232, 234, respectively. The bottom of the mold leaflet 56 is defined by a bottom plate 236. The bottom plate 236 is covered by a layer of insulating material 238.

The mold leaflet 58 includes two mold face plates 240, 242. Disposed between the mold face plates 240, 242 is a steel frame that stiffens the mold face plates against deflection or deformation by the weight of plastic concrete placed in the mold leaves 50-62. The frame comprises three horizontal steel tubes and a plurality of vertical steel tubes of the same design as used for the leaflet 52 and includes a top horizontal steel tube 244 and a vertical steel tube 246. The opposite ends of the mold leaflet 58 are defined by two end plates 248, 250 preferably also made of steel. Each of the end plates 248, 250 is covered by a layer of insulation 252, 254, respectively. The bottom of the mold leaflet 58 is defined by a bottom plate 256. The bottom plate 256 is covered by a layer of insulating material 258.

The mold leaflet 60 includes two mold face plates 260, 262. Disposed between the mold face plates 260, 262 is a steel frame that stiffens the mold face plates against deflection or deformation by the weight of plastic concrete placed in the mold leaves 50-62. The frame comprises three horizontal steel tubes and a plurality of vertical steel tubes of the same design as used for the leaflet 52 and includes a top horizontal steel tube 264 and a vertical steel tube 266. The opposite ends of the mold leaflet 58 are defined by two end plates 268, 270 preferably also made of steel. Each of the end plates 268, 270 is covered by a layer of insulation 272, 274, respectively. The bottom of the mold leaflet 58 is defined by a bottom plate 276. The bottom plate 276 is covered by a layer of insulating material 278.

Figure 5:
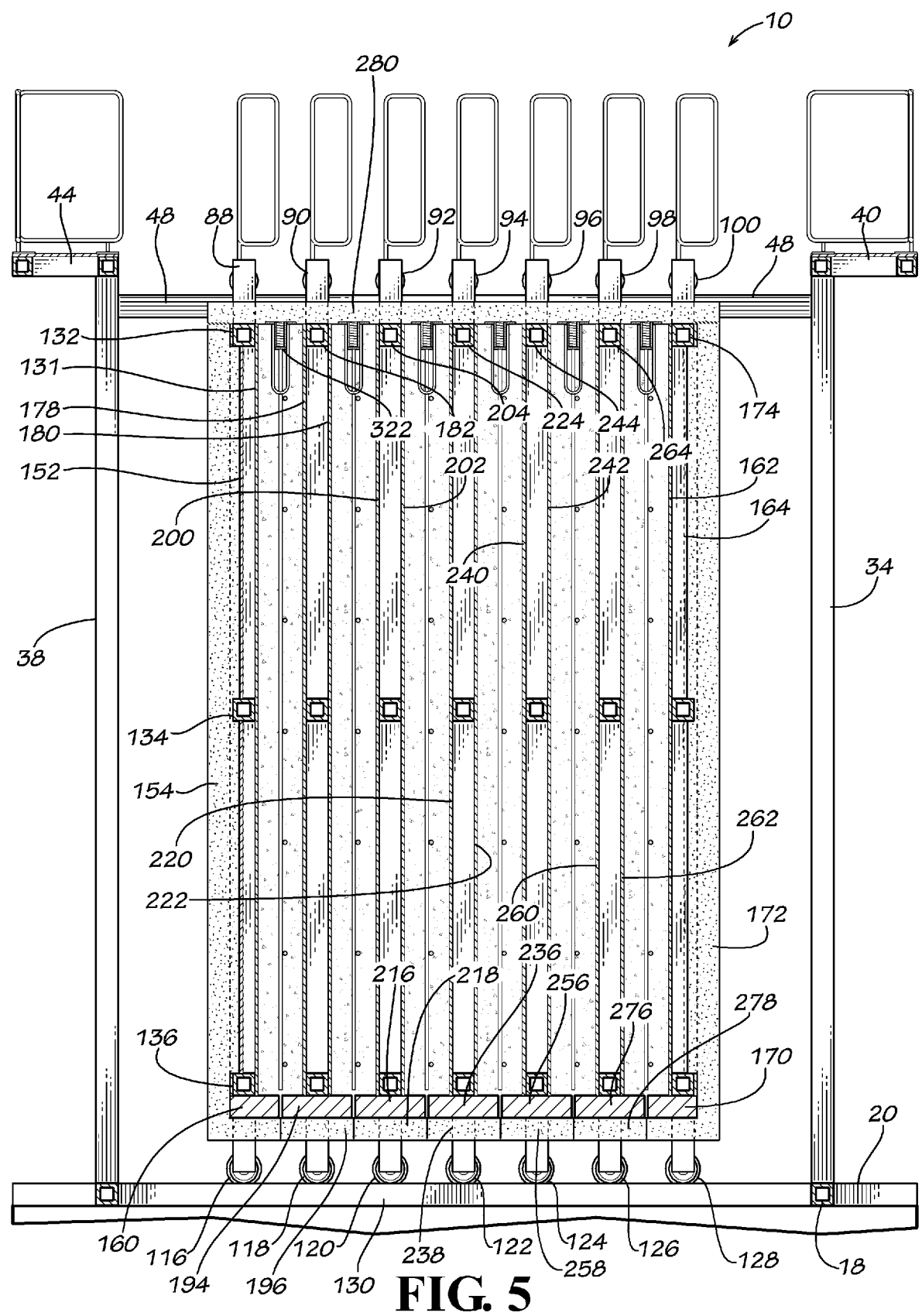
FIG. 5 is a cross-sectional view taken along the line 5-5 of the insulated concrete battery mold shown in FIG. 2.
Figure 6:
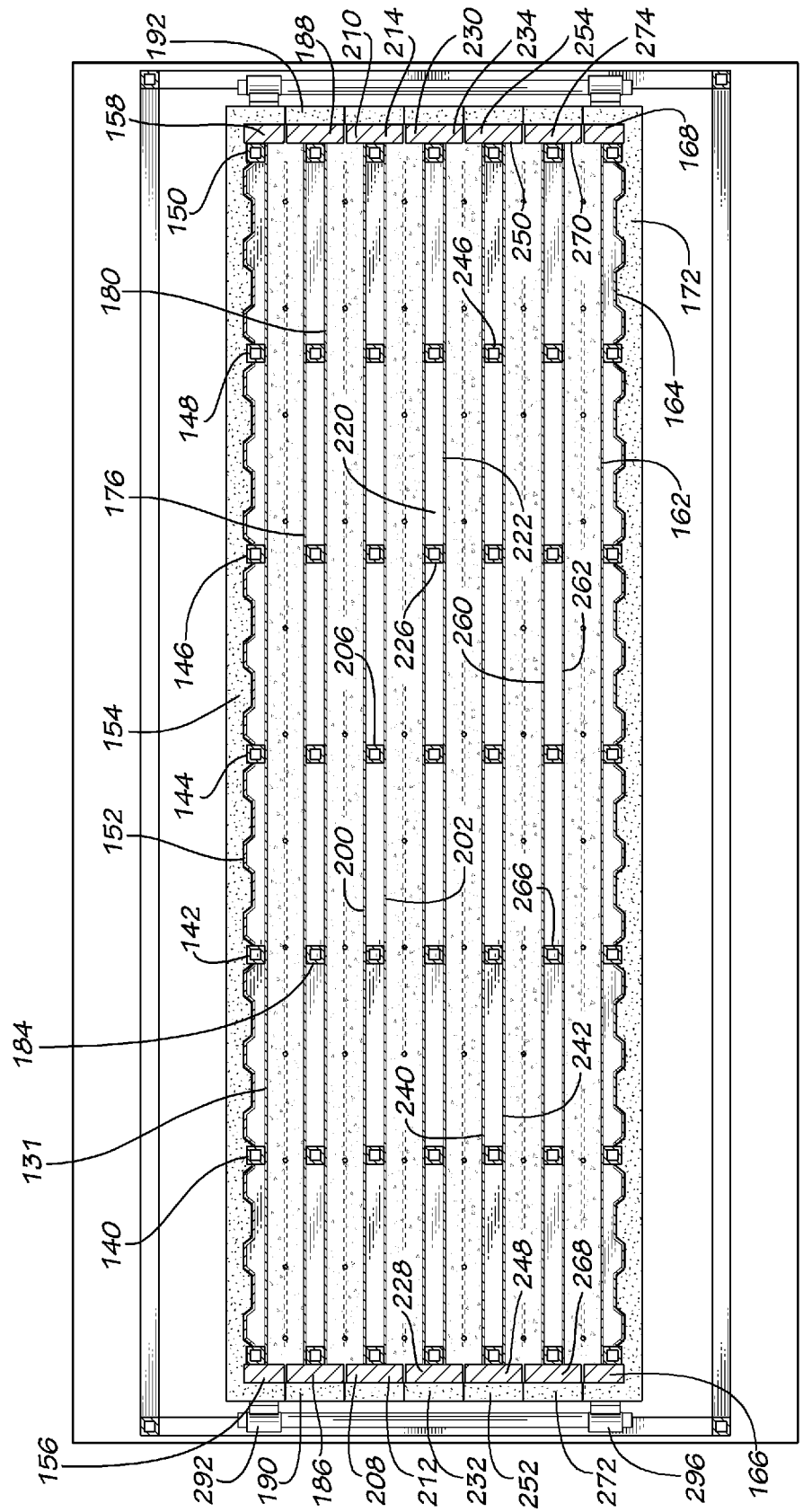
FIG. 6 is a cross-sectional view taken along the line 6-6 of the insulated concrete battery mold shown in FIG. 3.

It is a specific aspect of the present invention that the heat of hydration of concrete placed in one mold leaf can be transferred to concrete in an adjacent mold leaf. Therefore, it is desirable that the space defined by adjacent mold face plates, such as the mold face plates 176, 180, include a heat conductive material so that heat from one mold face plate will be conducted to the other mold face plate. Therefore, in the space defined by adjacent mold face plates, such as the mold face plates 176, 180, corrugated metal (not shown) can be placed so it contacts both the mold face plate 176 and the mold face place 180. Thus, heat from the mold face plate 176 can flow through the corrugated metal (not shown) to the mold face plate 180, and vice versa. In addition, heat can flow from one adjacent mold face plate, such as 176, to the other mold face plate, such as 180, through the plurality of vertical steel tubes (FIG. 6) and top, middle and bottom horizontal steel tubes (FIG. 5), such as the horizontal steel tube 182 and the vertical steel tube 184.

Covering, or substantially covering, the top of the mold leaves 50-62 is a layer of insulation 280. The layer of insulating material 280 is preferably a concrete insulating blanket or any type of rigid polymeric insulating material.

The layers of insulating material 154, 172, 190, 192, 212, 214, 232, 234, 252, 254, 272, 274, 280 preferably are made from a material that insulates against conductive heat loss and preferably insulates against both conductive heat loss and radiant heat loss. The layers of insulating material 154, 172, 190, 192, 212, 214, 232, 234, 252, 254, 272, 274, 280 preferably are made from closed cell insulating foams, including, but not limited to, polyvinyl chloride, urethane, polyurethane, polyisocyanurate, phenol, polyethylene, polyimide or polystyrene. Such insulating foam preferably has a density of 1 to 3 pounds per cubic foot, or more.

The layers of insulating material 154, 172, 190, 192, 212, 214, 232, 234, 252, 254, 272, 274, 280 preferably have insulating properties equivalent to at least 0.25 inches of expanded polystyrene foam, equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum insulating equivalence of 8 inches of expanded polystyrene foam can be used. In another embodiment of the present invention, the layers of insulating material 154, 172, 190, 192, 212, 214, 232, 234, 252, 254, 272, 274, 280 have insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the layers of insulating material 154, 172, 190, 192, 212, 214, 232, 234, 252, 254, 272, 274, 280 used in another disclosed embodiment of the present invention have insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layers of insulating material 154, 172, 190, 192, 212, 214, 232, 234, 252, 254, 272, 274, 280 should have an R-value of greater than 1.5, preferably greater than 4, more preferably greater than 8, especially greater than 12, most especially greater than 20. The layer of insulating material 202 preferably has an R-value of approximately 1.5 to approximately 40; more preferably between approximately 4 to approximately 40; especially approximately 8 to approximately 40; more especially approximately 12 to approximately 40. The layers of insulating material 154, 172, 190, 192, 212, 214, 232, 234, 252, 254, 272, 274, 280 preferably have an R-value of approximately 1.5, more preferably approximately 4, most preferably approximately 8, especially approximately 20, more especially approximately 30, most especially approximately 40.

In an alternate disclosed embodiment, the layers of insulating material 154, 172, 190, 192, 212, 214, 232, 234, 252, 254, 272, 274, 280 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various form including, but not limited to, bulk fiber, foam, blanket, board, felt and paper form. Refractory insulation is commercially available in blanket form as Fiberfrax Durablanket insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from $1/32$ inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer or a polymeric foam, such as polyurethane, latex, cement or epoxy, and used as a coating to create a refractory insulating material layer, for example covering, or substantially covering, the corrugated panels 152, 164; the end plates 156, 158, 166, 168, 186, 188, 208, 210, 228, 230, 248, 250, 268, 270 and the bottom plates 160, 170, 194, 216, 236, 256, 276. As used herein the term "substantially covers" means covering at least 80% of the surface area. Such a refractory insulating material layer can be used as the layers of insulating material 154, 172, 190, 192, 212, 214, 232, 234, 252, 254, 272, 274, 280 to block excessive ambient heat loads and retain the heat of hydration within the mold leaves of the present invention. Ceramic fibers in a polymer binder, such as latex, are commercially available as Super Therm®, Epoxotherm and HPC Coating from Superior Products, II, Inc., Weston, Fla., USA. Fillers can also be added to the polymer or polymeric foam, such as fly ash, volcanic ash, crushed glass, glass spheres and the like.

The layers of insulating material 154, 172, 190, 192, 212, 214, 232, 234, 252, 254, 272, 274, 280 are preferably a multi-layer material with a first layer of refractory insulating material and a second layer of polymeric foam insulating material. The layers of insulating material 154, 172, 190, 192, 212, 214, 232, 234, 252, 254, 272, 274 more preferably comprises a layer of refractory insulating felt or board and a layer of expanded polystyrene foam.

Optionally, the layers of insulating material 154, 172, 190, 192, 212, 214, 232, 234, 252, 254, 272, 274, 280 include an outer protective layer, such as the protective layers 282, 284. The protective layers 282, 284 can be made from a metal sheet, such as steel sheet or aluminum sheet, or from a metal foil, such as aluminum foil. In another embodiment, the protective layers 282, 284 are made from a sheet of polymeric material, including, but not limited to, polyethylene, polypropylene, polyvinyl chloride, polyvinyl acetate, urethane, polyurethane and the like.

Attached to the end plate 156 of the mold leaflet 50 are an upper bracket 290 and a lower bracket 292. Similarly, attached to the end plate 166 of the mold leaflet 62 are an upper bracket 294 and a lower bracket 296. Identical brackets are attached to the end plate 158 of the mold leaflet 50 and the end plate 168 of the mold leaflet 62. Attached to the bracket 290 and the bracket 294 is a first hydraulic cylinder 298. Similarly, attached to the bracket 292 and the bracket 296 is a second hydraulic cylinder 300. Identical hydraulic cylinders are attached to the brackets on the other end of the end plates 50, 62. The hydraulic cylinders 298, 300 are used to open and close the mold leaves 50-62, as well as to hold the mold leaflets together under the fluid pressure of the concrete. By extending the hydraulic cylinders 298, 300, the mold leaves 50, 62 will move away from each other. By contracting the hydraulic cylinders 298, 300, the mold leaves 50, 62 will move toward each other and shut and kept tight in a closed position to resist the fluid concrete pressure.

Attached to the top of each of the horizontal steel pipes 132, 174, 182, 204, 224, 244, 264 are a plurality of lifting hooks, such as the hooks 302, 304, 306. The hooks 302-306 can be used to lift the mold leaves 50-62 vertically upward out of the insulated concrete battery mold 10. The hooks 302-306 can also be used to pull the mold leaves 50-62 apart in order to open the mold and strip the concrete panels cast therein.

Figure 4:
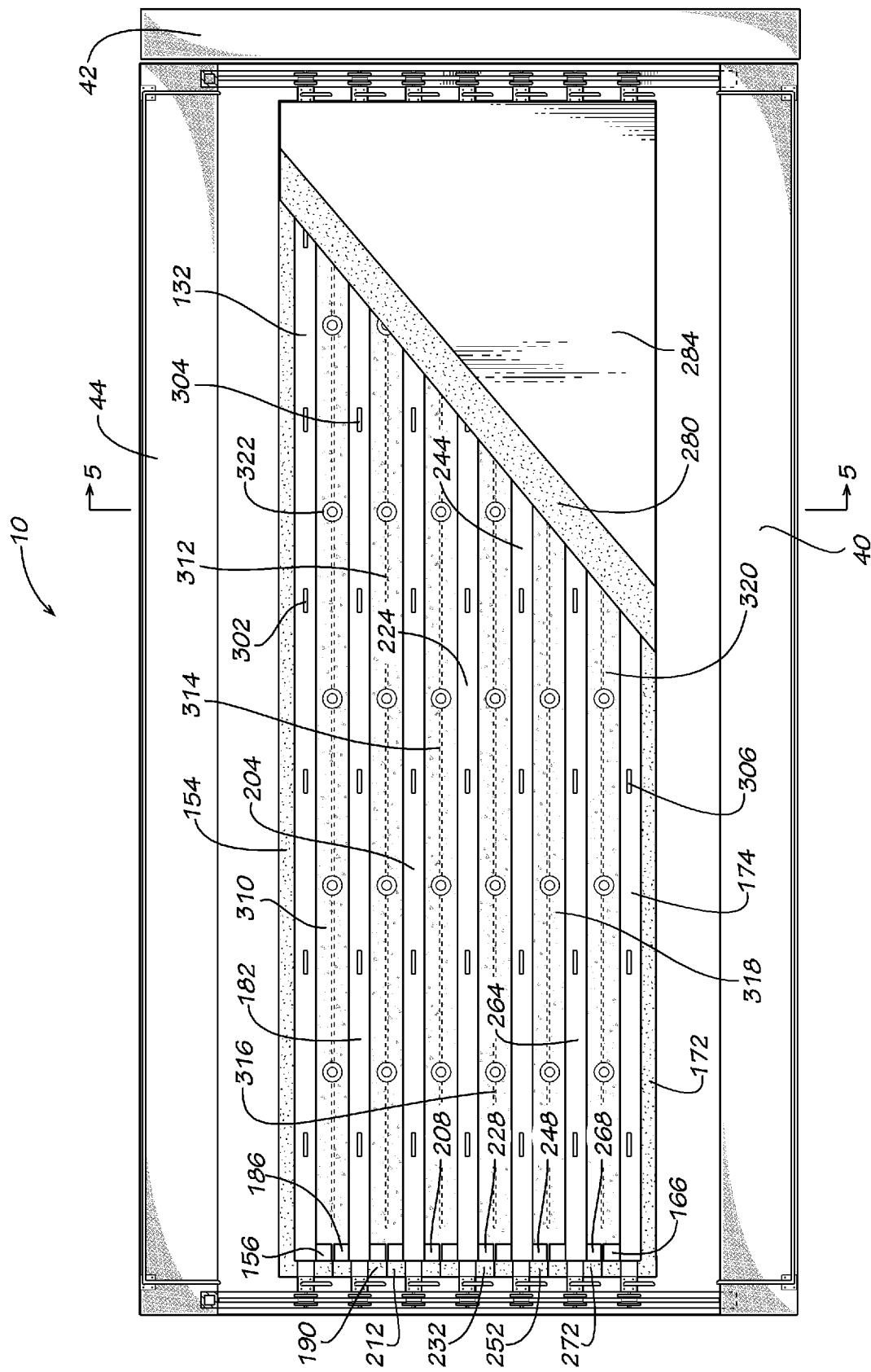
FIG. 4 is a top plan view of the insulated concrete battery mold shown in FIG. 1.

It will be appreciated that the mold leaves 50, 52 define a concrete mold cavity 310 therebetween. The mold leaflet 50 defines one-half of the mold cavity 310 (FIG. 4) and the mold leaflet 52 defines the other half of the mold cavity when the two mold leaves 50, 52 are pushed together until they contact each other. Conversely, when the mold leaflet 50 is moved away from the mold leaflet 52 so that the mold leaves are no longer contacting each other, a concrete panel cast therein can be lifted out of the mold cavity. In a similar manner, the mold leaves 52, 54 define another mold cavity 312 therebetween; the mold leaves 54, 56 define another mold cavity 314 therebetween; the mold leaves 56, 58 define another mold cavity 316 therebetween; the mold leaves 58, 60 define another mold cavity 318 therebetween; the mold leaves 60, 62 define another mold cavity 320 therebetween. The insulated concrete battery mold 10 shown in this embodiment includes six mold cavities. It is specifically contemplated that the present invention can be practiced with insulated concrete battery molds have a greater or lesser number of mold cavities.

It is specifically contemplated that the heat produced by the hydration of cementitious materials, such as portland cement, within the mold cavities; i.e., mold cavities 310-320 can flow between the adjacent mold cavities because there is no insulation provided between the mold cavities. Specifically, the mold face plates 178, 180, 200, 202, 220, 222, 240, 242, 260, 262 are preferably made from a good heat conducting material, such as steel or aluminum. This allows for relatively efficient transmission of heat between adjacent mold cavities 310-320. However, it is undesirable to allow the heat of hydration to escape from the mold cavities 310-320 to the surrounding of the battery mold 10. Thus, the layers of insulating material 154, 172, 190, 192, 212, 214, 232, 234, 252, 254, 272, 274, 280 completely surround the mold leaves 50-62 and thermally isolate the mold cavities 310-320 from the environment, but the adjacent mold cavities are in thermal communication. Thermal bridging; i.e., direct contact between good heat conducting materials, such as steel or aluminum to steel or aluminum, of the face plates 131, 162 to the environment must be avoided.

Use of the insulated concrete battery mold 10 will now be considered. The insulated concrete battery mold 10 is prepared for filling with plastic concrete with the mold cavities 310-320 closed. This is done by contacting the hydraulic cylinders 298, 300 until the mold leaves 50-62 contact each other. Then, plastic concrete can be placed in any one or more of the mold cavities 310-320. Vertical and horizontal rebar, or other concrete reinforcing members, can be placed in the mold cavities 310-320 before the plastic concrete is placed in the mold cavities. If desired various inserts can be placed in the plastic concrete in the mold cavities 310-320, such as a plurality of threaded inserts, such as the inserts 322. Threaded hooks (not shown) can then be screwed into the threaded inserts, such as the threaded insert 322, so that steel cables from a lifting crane can be attached thereto in order to lift the cured concrete panels out of the mold cavities. Any other types of concrete insert know in the art can be used within the concrete elements cast in the insulated battery mold.

After the plastic concrete has been placed in the mold cavities 310-320, the layer of insulating material 280 is placed on top of the mold leaves 50-62. It will be appreciated that the layers of insulating material 154, 172, 190, 192, 212, 214, 232, 234, 252, 254, 272, 274, 280 completely surround the mold leaves 50-62 in insulating material. The layer of insulating material 280 is left in place until the concrete within the mold cavities 50-62 has achieved a desired amount or degree of cure so that the concrete panels have sufficient strength so that they can be removed from the mold cavities 310-320 without damaging the concrete panels. The amount of time for the concrete panels to reach a desired amount or degree of cure will vary based on a number of factors including the concrete mix design, the size of the concrete panels, ambient temperature conditions, the amount of insulation provided around the battery mold, the amount and kind of concrete curing additives used and the like. However, the concrete in the mold cavities 310-320 can will usually achieve sufficient strength to be removed from the mold cavities within 1 to approximately 14 days, preferably 1 to approximately 10 days, more preferably 1 to approximately 7 days, most preferably 1 to approximately 5 days, especially 1 to approximately 3 days, more especially approximately 12 hours to approximately 3 days.

After the concrete in the mold cavities 310-320 has achieved a desired amount or degree of cure, the mold leaves 50-62 are opened. This is done by extending the hydraulic cylinders 298, 300. As each of the mold cavities 310-320 is opened, lifting hooks (not shown) are screwed into the threaded inserts, such as the threaded insert 322 and the partially cured concrete panel is lifted out of the mold cavity. Preferably, the concrete panels are removed from the mold cavities 310-320 when the concrete has achieved a sufficient amount or degree of cure such that the concrete panel can be stripped from the mold and moved without damaging the concrete panel, but the concrete panel needs additional curing before it can be used in constructing a desired structure. Thus, after the concrete panels have been stripped from the mold cavities 210-320, they are moved to a final curing station, such as shown if FIGS. 8-10. Since the insulated concrete battery mold 10 is designed to retain the heat of hydration, the concrete panels would have stored the heat of hydration and still be warm at the time they are removed from the battery mold. The final curing station will further retain the heat stored within the concrete panels and further retain any heat of hydration generated by the continuing hydration process within the concrete panels. Although the curing station shows the concrete panels stacked horizontally for ease of use, another embodiment can be used where the concrete panels are supported by lateral bracing and stacked vertically. The insulating material can be applied in the same manner as in the horizontal stacking.

At the concrete curing station 400, the concrete panels removed from the insulated concrete battery mold are stacked horizontally for additional curing. Before the first concrete panel is placed in the concrete curing station, a series of foam insulating panels, such as the foam insulating panels 402, 404, 406, 408, 410, 412, 414 are placed on a solid, horizontal surface, such as a concrete slab 416. The foam insulating panels 402-414 are separated from each other by horizontal spacer made from any suitable material, such as a piece of wood, having a length equal to the width of the concrete panel and a thickness sufficient to support a plurality of concrete panels above the foam insulating panels, such as 4 inch by 4 inch posts 416, 418, 420, 422, 424, 426. A first concrete panel 428 is then placed horizontally on the foam insulating panels 402-414 and the posts 416-426. A plurality of spacers made of any suitable material, such as wood pieces, having a length equal to the width of the concrete panel and a thickness sufficient to support a plurality of concrete panels above the concrete panel 428 are placed on the upper surface of the concrete panel 428, such as 2 inch by 4 inch wood studs 430, 432, 434, 436. A second concrete panel 438 is then paced horizontally on top of the wood studs 430-436. Again, a plurality of wood pieces are placed on the upper surface of the concrete panel 438, such as 2 inch by 4 inch wood studs 440, 442, 444, 446. A third concrete panel 448 is then placed horizontally on top of the wood studs 440-446. A plurality of wood pieces are placed on the upper surface of the concrete panel 448, such as 2 inch by 4 inch wood studs 450, 452, 454, 456. A fourth concrete panel 458 is then placed horizontally on top of the wood studs 450-456. Although the present invention is shown as stacking four concrete panels 428, 438, 448, 458 at the concrete curing station 400, a larger or smaller number of concrete panels can be stacked for suing as desired.

After the concrete panels 428, 438, 448, 458 are stacked, a layer of insulating material 460 is laid over the top and sides of the stacked concrete panels. The layer of insulating material 460 and the foam insulating panels 402-414 preferably have insulating properties equivalent to at least 0.25 inches of expanded polystyrene foam, equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum insulating equivalence of 8 inches of expanded polystyrene foam can be used. In another embodiment of the present invention, the layer of insulating material 460 and the foam insulating panels 402-414 have insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the layer of insulating material 460 and the foam insulating panels 402-414 used in another disclosed embodiment of the present invention have insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 460 and the foam insulating panels 402-414 should have an R-value of greater than 1.5, preferably greater than 4, more preferably greater than 8, especially greater than 12, most especially greater than 20. The layer of insulating material 202 preferably has an R-value of approximately 1.5 to approximately 40; more preferably between approximately 4 to approximately 40; especially approximately 8 to approximately 40; more especially approximately 12 to approximately 40. The layer of insulating material 460 and the foam insulating panels 402-414 preferably have an R-value of approximately 1.5, more preferably approximately 4, most preferably approximately 8, especially approximately 20, more especially approximately 30, most especially approximately 40. The layer of insulating material 460 is preferably a concrete curing blanket.

The layer of insulating material 460 is left on the stacked concrete panels 428, 438, 448, 458 for a time sufficient for the concrete panels to achieve a desired amount or degree of cure. The amount of time for the concrete panels 428, 438, 448, 458 to reach a desired amount or degree of cure will vary based on a number of factors including the concrete mix design, the size of the concrete panels, the concrete panels temperature at the time of removal from the battery mold, ambient temperature conditions, the amount of insulation provided around the stacked concrete panels, the amount and kind of concrete curing additives used and the like. However, the concrete panels 428, 438, 448, 458 will usually achieve a sufficient amount or degree of cure within 1 to approximately 14 days, preferably 1 to approximately 10 days, more preferably 1 to approximately 7 days, most preferably 1 to approximately 5 days, especially 1 to approximately 3 days, more especially approximately 12 hours to approximately 3 days. After the concrete panels 428, 438, 448, 458 have achieved a desired amount or degree of cure, the layer of insulating material 460 is removed and the concrete panels 428, 438, 448, 458 are removed from the stack. The concrete panels 428, 438, 448, 458 are then ready to be used in constructing a desired structure.

Figure 10:
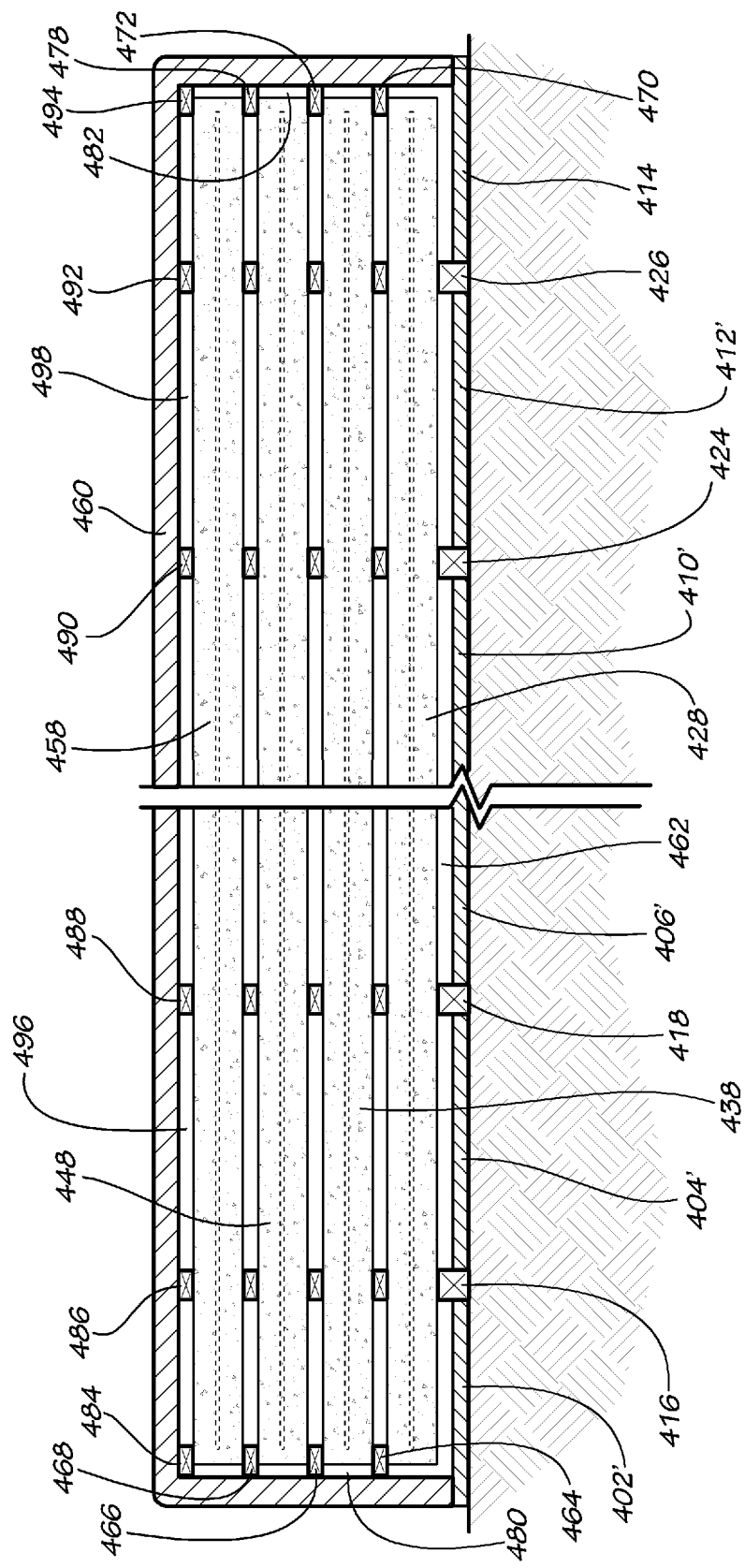
FIG. 10 is a longitudinal cross-sectional view of an alternate disclosed embodiment of the concrete curing station shown in FIG. 8.

With reference to FIG. 10, there is shown an alternate disclosed embodiment of the present invention. FIG. 10 shows an alternate embodiment of the curing station. Specifically, FIG. 10 shows that the layers of insulation 402', 404', 406', 410', 412', 414' are thinner than the posts 416-426 thereby leaving an air space between the layers of insulation 402'-414' and the concrete panel 428, such as the air space 462. Also, additional 2 inch by 4 inch wood studs 464, 466, 468, 470, 472, 474 are added at the periphery between adjacent concrete panels 428, 438, 448 so as to provide an air space between the ends of the concrete panels and the layer of insulating material 460, such as the air spaces 480, 482. Furthermore, a plurality of wood pieces are placed on the upper surface of the concrete panel 458, such as 2 inch by 4 inch wood studs 484, 486, 488, 490, 492, 494 so as to define an air space between the concrete panel 458 and the layer of insulating material 460, such as the air spaces 496, 498 so that the layer of insulating material is not in direct contact with the concrete panels 428, 438, 448, 458. The air space between the concrete panels 428, 438, 448, 458, such as the air space 496, 498, and the layer of insulating material 460 provides additional insulation. The air space between the concrete panels 428, 438, 448, 458 and the layer of insulating material 460, such as the air space 496, 498, can be of any desirable thickness such as approximately 1 inch to approximately 4 inches, preferably approximately 2 inches to approximately 6 inches, more preferably approximately 4 inches to approximately 8 inches and is only limited by the thickness of the spacing materials, such as the spacer materials. It is the intent of the present invention to create a greenhouse-type effect within the enclosed structure whereby the heat of hydration from the concrete panels is retained so that the concrete curing process is accelerated.

A particular advantage of the present invention is that the insulated concrete battery mold 10 includes a plurality of mold cavities, such as the mold cavities 210-230, but is insulated around the outside of the mold cavities collectively rather than individually. Therefore, the concrete that is cured in the insulated concrete battery mold 10 exhibits some of the properties of mass concrete. That is, a rather large amount of heat will be generated by the heat of hydration from a plurality of curing concrete-filled mold cavities. This considerable amount of heat is retained by the layers of insulating material 154, 172, 190, 192, 212, 214, 232, 234, 252, 254, 272, 274, 280. This retained heat of hydration results in an acceleration of the concrete curing process. The relatively large amount of retained heat also allows the use of concrete mix formulations with significantly reduced amounts of portland cement and relatively high amounts of supplementary cementitious materials, such as slag cement and fly ash. The present invention also permits the casting and curing of concrete in ambient temperature conditions that otherwise would not be suitable for casting and curing concrete, such as cold weather.

In another embodiment the layer of insulating material 460 is comprised of multiple layers and has heat absorbing properties on the top surface and radiant heat reflective properties on the bottom layer; i.e., the layer closest to the concrete panels, and conductive heat insulating properties on the middle layer. Preferably the upper surface of made from a dark colored material, such as black material, so that the radiant solar heat energy is captured and transmitted through the insulating blanket layers to the insulated enclosure. By absorbing radiant solar heat, the passive curing enclosure further provides additional heat to aid the curing of the concrete without any additional cost. The insulated blanket radiant heat reflective material is disposed on the bottom of the insulated blanket so that the heat of hydration generated from the concrete panels is reflected back into the concrete panels.

In another disclosed embodiment of the present invention, when the concrete panels are stacked either horizontally or vertically the use of spacers between each concrete slabs is optional. Therefore, the concrete elements can be in direct thermal contact with each other.

In another disclosed embodiment of the present invention, the layers of insulating material 154, 172, 280 are electrically heated concrete curing blankets. When electrically heated concrete curing blankets are used for the layers of insulating material 154, 172, 280, heat can be applied to the plastic concrete within the mold cavities 310-320 to accelerate the curing of the plastic concrete.

In another disclosed embodiment of the present invention, when electrically heated concrete curing blankets are used for the layers of insulating material 154, 172, 280, it is desirable for the temperature of the concrete within the mold cavities to be controlled so that the temperature of the concrete follows a predetermined temperature profile in the manner disclosed in applicant's U.S. Pat. No. 8,532,815 (the disclosure of which is incorporated herein by reference in its entirety). To do so, the electrically heat concrete curing blanket is controlled by a controller connected to a computing device that is also connected to one or more temperature sensors configured to sense the temperature of the concrete in the mold cavities 310-320 in the same manner as disclosed in applicant's U.S. Pat. No. 8,532,815 (the disclosure of which is incorporated herein by reference in its entirety).

In another disclosed embodiment of the present invention, the layer of insulating material 460 is an electrically heated concrete curing blanket. When an electrically heated concrete curing blanket is used for the layer of insulating material 460, heat can be applied to the stacked concrete panels 428, 438, 448, 458 to accelerate the curing of the concrete.

In another disclosed embodiment of the present invention, when an electrically heated concrete curing blanket is used for the layer of insulating material 460, it is desirable for the temperature of the stacked concrete panels 460 to be controlled so that the temperature of the concrete panels follow a predetermined temperature profile in the manner disclosed in applicant's U.S. Pat. No. 8,532,815 (the disclosure of which is incorporated herein by reference in its entirety). To do so, the electrically heat concrete curing blanket is controlled by a controller connected to a computing device that is also connected to one or more temperature sensors configured to sense the temperature of the stacked concrete panels 428, 438, 448, 458 in the same manner as disclosed in applicant's U.S. Pat. No. 8,532,815 (the disclosure of which is incorporated herein by reference in its entirety).

Figure 8:
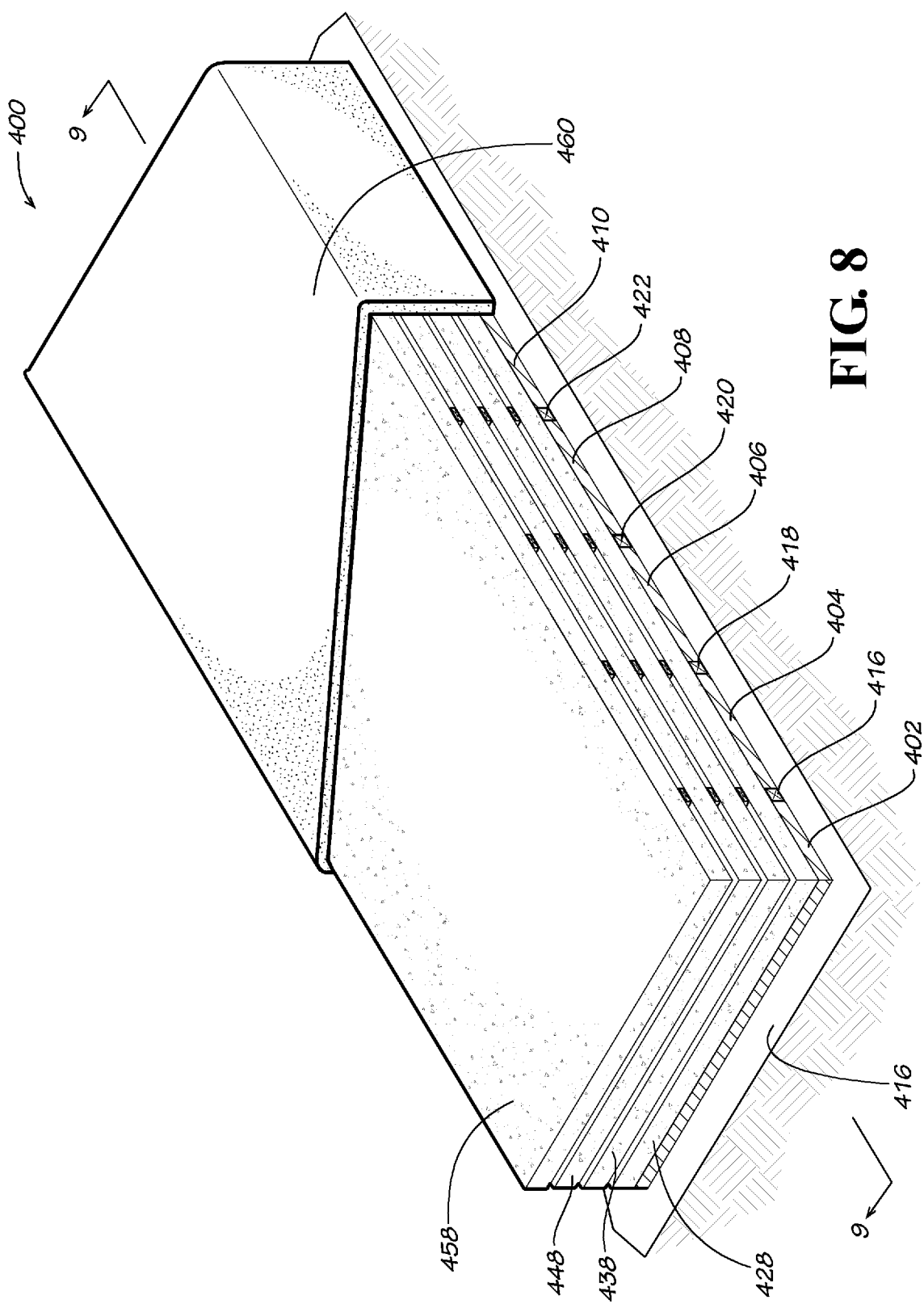
FIG. 8 is a perspective view of a disclosed embodiment of a concrete curing station in accordance with the present invention.
Figure 9:
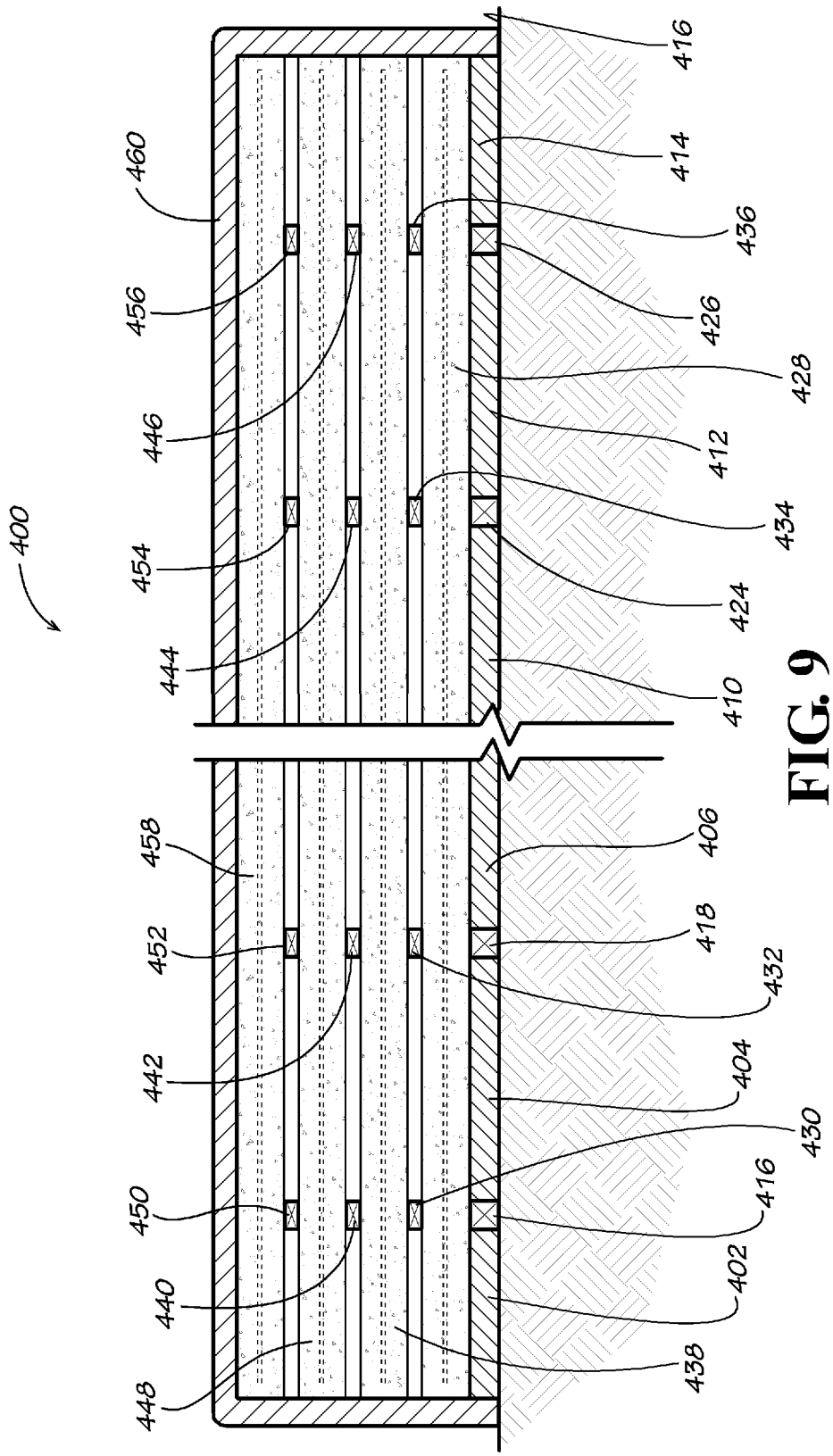
FIG. 9 is a longitudinal cross-sectional view of the concrete curing station shown in FIG. 8.

It is understood that any of the above disclosed embodiments can be used in either a horizontal application as shown in FIG. 8-10 or in a similar way stacked in a vertical fashion (not shown).

Figure 11:
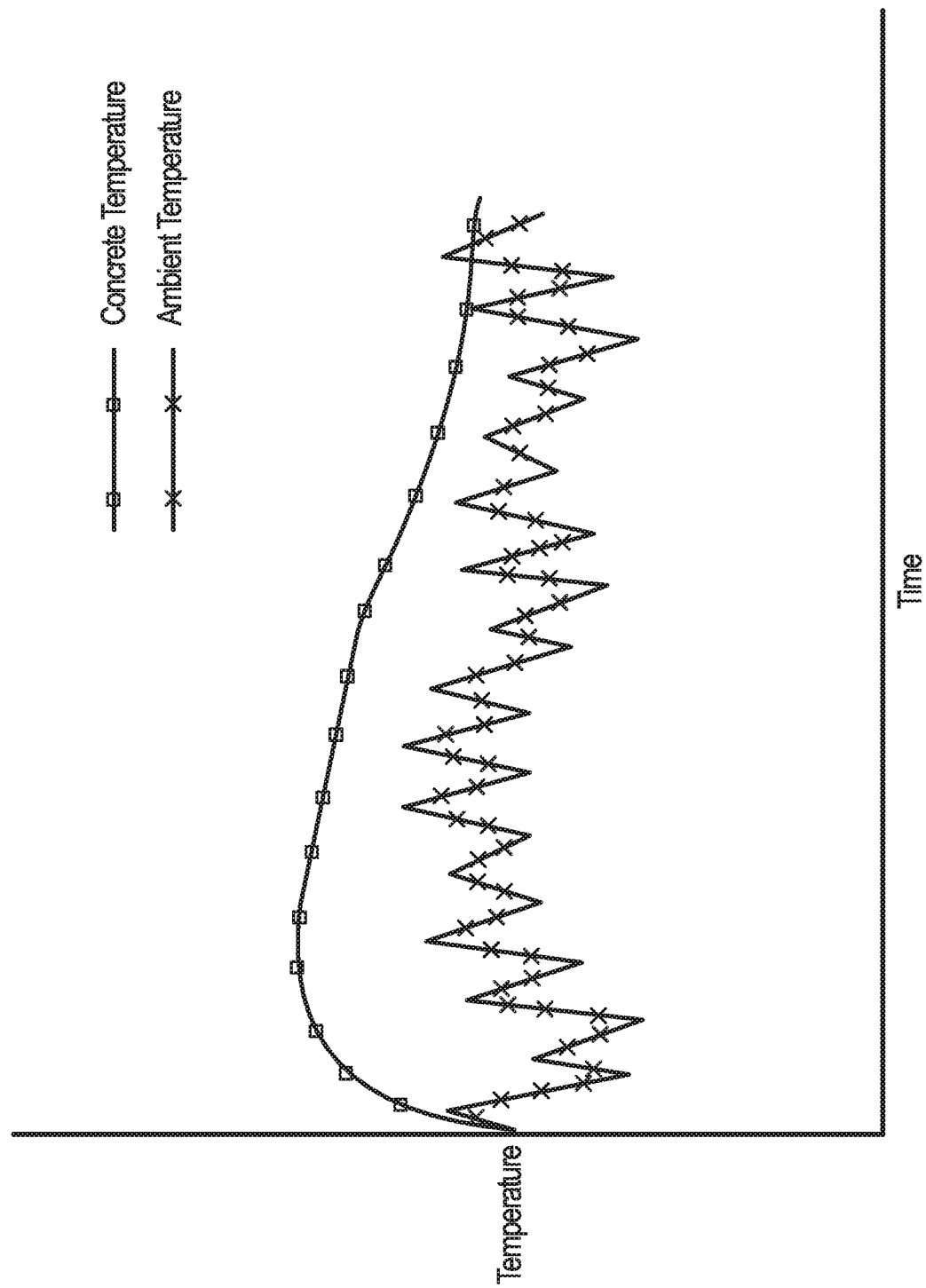
FIG. 11 is a graph of concrete temperature versus elapsed concrete curing time of a disclosed embodiment of a curing temperature profile for concrete in accordance with the present invention. An example of ambient temperature is also shown on the graph.

FIG. 11 shows a graph of a disclosed embodiment of a desired curing temperature profile for concrete as a function of time in accordance with the present invention. In this graph, the temperature of the concrete is shown on the vertical axis and elapsed concrete curing time is shown on the horizontal axis. The intersection of the vertical and horizontal axes represents 0° C. concrete temperature and zero elapsed concrete curing time. Ambient temperature is also shown on this graph. The peaks and troughs of the ambient temperature represent the daily (i.e., day to night) fluctuation of ambient temperature. As can be seen in this graph, the temperature of the concrete initially increases quite rapidly over a relatively short time, such as 1 to 3 days. After a period of time, the concrete temperature reaches a maximum and then slowly drops to ambient temperature over an extended period, such as 1 to 7 days, preferably 1 to 14 days, more preferably 1 to 28 days, especially 3 to 5 days or more especially 5 to 7 days. The maximum temperature will vary depending on the composition of the concrete mix. However, it is desirable that the maximum temperature is at least 35° C., preferably, at least 40° C., at least 45° C., at least 50° C., at least 55° C., at least 60° C. or at least 65° C. The maximum concrete temperature should not exceed about 70° C. The maximum concrete temperature is preferably about 70° C., about 69° C., about 68° C., about 67° C., about 66° C., about 65° C., about 64° C., about 63° C., about 62° C., about 61° C. about 60° C. or about 60 to about 70° C. Furthermore, it is desirable that the temperature of the concrete is maintained above approximately 30° C., approximately 35° C., approximately 40° C., approximately 45° C., approximately 50° C., approximately 55° C. or approximately 60° C. for 1 to approximately 4 days from the time of concrete placement, preferably 1 to approximately 3 days from the time of concrete placement, more preferably about 24 to about 48 hours from the time of concrete placement. It is also desirable that the temperature of the concrete is maintained above approximately 30° C. for 1 to approximately 7 days from the time of concrete placement, preferably above approximately 35° C. for 1 to approximately 7 days from the time of concrete placement, more preferably above approximately 40° C. for 1 to approximately 7 days from the time of concrete placement, most preferably above approximately 45° C. for 1 to approximately 7 days from the time of concrete placement. It is also desirable that the temperature of the concrete be maintained above ambient temperature for 1 to approximately 3 days from the time of concrete placement; 1 to approximately 5 days from the time of concrete placement, for 1 to approximately 7 days from the time of concrete placement, for 1 to approximately 14 days from the time of concrete placement, preferably approximately 3 to approximately 14 days from the time of concrete placement, especially approximately 7 to approximately 14 days from the time of concrete placement. It is also desirable that the temperature of the concrete be maintained above ambient temperature for approximately 3 days, approximately 5 days, approximately 7 days or approximately 14 days from the time of concrete placement. It is further desirable that the temperature of the concrete be reduced from the maximum temperature to ambient temperature gradually, such as in increments of approximately 0.5 to approximately 5° C. per day, preferably approximately 1 to approximately 2° C. per day, especially approximately 1° C. per day. The electrically heated blanket is preferably kept on the curing concrete until the concrete is strong enough such that cracking due to temperature shrinkage will not occur from further cooling. Different curing temperature profiles may apply to different concrete mix designs and/or different materials used for the cementitious portion of the concrete mix in order to achieve a desired concrete strength or a desired concrete strength within a desired period of time in different weather conditions. However, all curing temperature profiles in accordance with the present invention will have the same general shape as shown in FIG. 11 relative to ambient temperature. Thus, as used herein the term "temperature profile" includes retaining the heat generated by the cement hydration reaction so as to increase the concrete temperature above ambient temperature over a period of time followed by decreasing the concrete temperature over a period of time, preferably to ambient temperature, wherein the slope of a line plotting temperature versus time during the temperature increase phase is greater than the absolute value of the slope of a line plotting temperature versus time during the temperature decrease phase. Furthermore, the absolute value of the slope of a line plotting temperature versus time during the temperature decrease phase of the temperature profile in a concrete form in accordance with the present invention is less than the absolute value of the slope of a line plotting temperature versus time if all added heat were stopped and the concrete were simply allowed to cool in a conventional concrete form; i.e., an uninsulated concrete form, under the same conditions. The term "temperature profile" includes the specific ranges of temperature increase and ranges of temperature decrease over ranges of time as set forth above with respect to FIG. 11. The term "temperature profile" includes increasing the temperature of curing concrete in a concrete form or mold to a maximum temperature at least 10% greater than the maximum temperature the same concrete mix would have reached in a conventional (i.e., non-insulated) concrete form or mold of the same configuration. The term "temperature profile" also includes reducing the temperature of curing concrete in a concrete form or mold from its maximum temperature at a rate slower than the rate the same concrete mix would reduce from its maximum temperature in a conventional (i.e., non-insulated) concrete form or mold of the same configuration. The principle behind concrete maturity is the relationship between strength, time, and temperature in young concrete. Maturity is a powerful and accurate means to predict early strength gain. Concrete maturity is measured as "equivalent age" and is given in temperature degrees× hours (either ° C.-Hrs or ° F.-Hrs). The term "temperature profile" includes controlling the temperature of curing concrete so that at 3 days it has a concrete maturity or equivalent age at least 25% greater than the same concrete mix would have in a conventional (i.e., non-insulated) concrete form or mold of the same configuration under the same conditions; preferably at least 30% greater, more preferably at least 35% greater, most preferably at least 40% greater, especially at least 45% greater, more especially at least 50% greater. The term "temperature profile" includes controlling the temperature of curing concrete so that at 3 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" includes controlling the temperature of curing concrete so that at 7 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" specifically does not include adding a constant amount of heat to the concrete followed by stopping adding heat to the concrete, such as would be involved when turning an electrically heated blanket or heated concrete form on and then turning the heated blanket or heated concrete form off. The term "temperature profile" specifically does not include heating the concrete to a desired temperature and then turning off the heat. In the present invention, the curing of the concrete in the insulated concrete battery mold 10 and further curing of the concrete in the concrete curing station 400 should be viewed as one process with respect to the temperature profile. In other words, the temperature profile at the time the concrete panel is removed from the insulated concrete battery mold 10 should resume; i.e., pick up where it left off on the time-temperature curve, when the concrete is placed in the concrete curing station 400.

Figure 7:
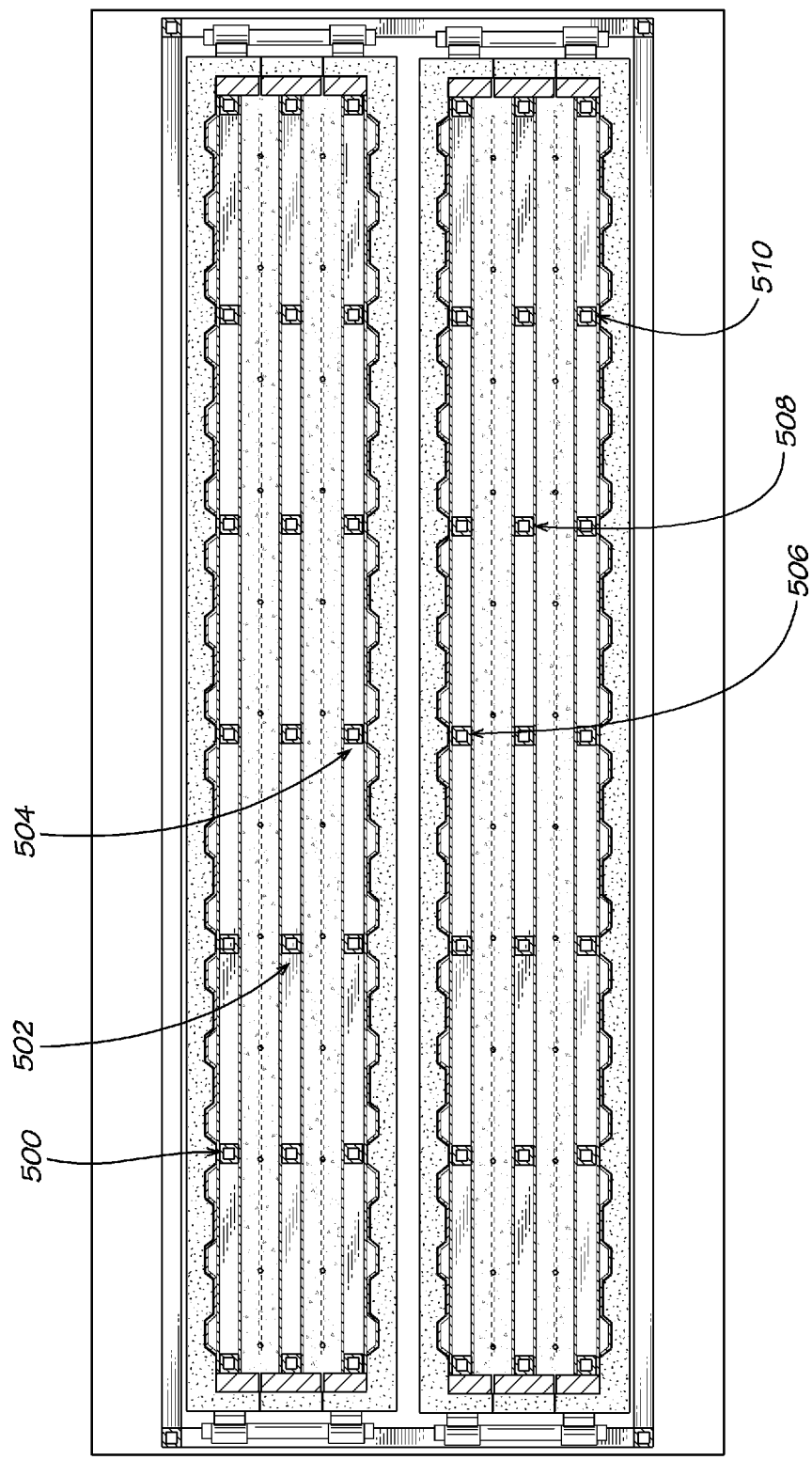
FIG. 7 is a cross-sectional view taken along the line 6-6 of an alternate disclosed embodiment of the insulated concrete battery mold shown in FIG. 3.

With reference to FIG. 7, there is shown an alternate disclosed embodiment of the present invention. FIG. 7 shows two groupings of three mold leaves each. Specifically, FIG. 7 shows a first grouping of two mold leaves identical to the mold leaves 50, 62 and a mold leaflet identical to the mold leaflet 52 therebetween. FIG. 7 then shows a second grouping of two mold leaves identical to the mold leaves 50, 62 and a mold leaflet identical to the mold leaflet 52 therebetween. Specifically, FIG. 7 shows a mold leaflet 500 of an identical construction as the mold leaflet 50; a mold leaflet 502 of an identical construction as the mold leaflet 52 and a mold leaflet 504 of an identical construction as the mold leaflet 62. Additionally, FIG. 7 shows a mold leaflet 506 of an identical construction as the mold leaflet 50; a mold leaflet 508 of an identical construction as the mold leaflet 52 and a mold leaflet 510 of an identical construction as the mold leaflet 62.

In another disclosed embodiment, the mold leaves 50, 62 include an electric resistance heating wire (not shown) in thermal contact with the face plates 131, 162 in the same manner as disclosed in applicant's U.S. Pat. No. 8,532,815 (the disclosure of which is incorporated herein by reference in its entirety). Electric resistance heating ribbons, tapes or wires are known and are the same type as used in electric blankets and other electric heating devices. The electric resistance heating wire is electrically insulated so that it will not make electrical contact with the face panel 131, 162. However, the electric resistance heating wire is in thermal contact with the face panel 131, 162 so that when an electric current is passed through the heating wire heats the panels. The electric resistance heating wire is placed in a serpentine path on the back surface of the panels 131, 162 so that the panel is heated uniformly. Holes (note shown) are provided in the bracing members, such as the vertical steel tubes 138-150 so that the electric resistance heating wire can pass there through. The electric resistance heating wire is of a type and the amount of wire in contact with the face panels 131, 162 is selected so that the electric resistance heating wire will heat the panels to a temperature at least as high as the temperature of the concrete. The heated concrete leaves can also be used to accelerate the curing of conventional concrete, as described above. Therefore, it is desirable that the face panels 131, 162 be able to be heated to temperatures sufficient to accelerate the curing of the concrete, such as at least as high as 70° C.

Alternatively, instead of electric resistance heating wires, any other type of fluid conductive heating system can be used in conjunction with the insulated battery mold of the present invention. That is fluid heating element (not shown); i.e., pipes, can be fitted on the battery mold exterior leaves, such as the face plates 131, 162. Heated fluids can then be pumped through these pipes so that their heat can be transferred to the face plates 131, 162. Suitable fluids can be oils, water or any other highly heat conductive fluid. A prior art heating system using heating fluids pumped through pipes is shown in U.S. Patent Application Publication No. 2010/0232877 (the disclosure of which is incorporated herein by reference in its entirety). A similar system can be adapted to work in accordance with the present invention.

While the present invention can be used with conventional concrete mixes; i.e., concrete in which portland cement is the only cementitious material used in the concrete, it is preferred as a part of the present invention to use the concrete, plaster or mortar mixes disclosed in applicant's U.S. Pat. No. 8,545,749 (the disclosure of which is incorporated herein by reference in its entirety). Concrete is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Specifically, the concrete mix in accordance with the present invention comprises cementitious material, aggregate and water sufficient to at least partially hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water-to-cementitious material ratio by weight is usually approximately 0.25 to approximately 0.7. Relatively low water-to-cementitious material ratios lead to higher strength but lower workability, while relatively high water-to-cementitious material ratios lead to lower strength, but better workability. Aggregate usually comprises 60% to 80% by volume of the concrete. However, the relative amount of cementitious material to aggregate to water is not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more. In particular, Ultra High Performance concrete, concrete panels or concrete elements with compressive strengths of over 20,000 psi can be cast and cured using the method of the present invention.

The aggregate used in the concrete used with the present invention is not critical and can be any aggregate typically used in concrete including, but not limited to, aggregate meeting the requirements of ASTM C33. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The preferred cementitious material for use with the present invention comprises Portland cement; preferably Portland cement and one of slag cement or fly ash; and more preferably Portland cement, slag cement and fly ash. Slag cement is also known as ground granulated blast-furnace slag (GGBFS). The cementitious material preferably comprises a reduced amount of Portland cement and increased amounts of recycled supplementary cementitious materials; i.e., slag cement and/or fly ash. This results in cementitious material and concrete that is more environmentally friendly. One or more cementitious materials other than slag cement or fly ash can also replace the Portland cement, in whole or in part. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than Portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material for use with a disclosed embodiment of the present invention comprises 0% to approximately 100% by weight portland cement; preferably, 0% to approximately 80% by weight portland cement. The ranges of 0% to approximately 100% by weight portland cement and 0% to approximately 80% by weight portland cement include all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material comprises approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material for use in one disclosed embodiment of the present invention also comprises 0% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention comprises 0% to approximately 50% by weight fly ash; preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash or any sub-combination thereof. Preferably the fly ash has an average particle size of <10 μm; more preferably 90% or more of the particles have a particles size of <10 μm.

The preferred cementitious material for use in one disclosed embodiment of the present invention comprises 0% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 50% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash, approximately 55% by weight fly ash, approximately 60% by weight fly ash, approximately 65% by weight fly ash, approximately 70% by weight fly ash or approximately 75% by weight fly ash, approximately 80% by weight fly ash or any sub-combination thereof. Preferably the fly ash has an average particle size of <10 μm; more preferably 90% or more of the particles have a particles size of <10 μm.

In one disclosed embodiment, the preferred cementitious material for use with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material for use with the present invention has a weight ratio of portland cement to slag cement to fly ash of 1:1:1. In another disclosed embodiment, the preferred cementitious material for use with the present invention has a weight ratio of portland cement to slag cement to fly ash of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

The cementitious material disclosed above can also optionally include 0% to approximately 50% by weight ceramic fibers, preferably 0% to 40% by weight ceramic fibers, more preferably 0% to 30% by weight ceramic fibers, most preferably 0% to 20% by weight ceramic fibers, especially 0% to 15% by weight ceramic fibers, more especially 0% to 10% by weight ceramic fibers, most especially 0% to 5% by weight ceramic fibers. A preferred ceramic fiber is Wollastonite. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

In one disclosed embodiment, the cementitious material for use with the present invention comprises 0% to approximately 100% by weight portland cement, 0% to approximately 90% by weight slag cement, and 0% to approximately 80% by weight fly ash. In one disclosed embodiment, the cementitious material for use with the present invention comprises 0% to approximately 80% by weight portland cement, 0% to approximately 90% by weight slag cement, and 0% to approximately 80% by weight fly ash. In another disclosed embodiment, the cementitious material for use with the present invention comprises 0% to approximately 70% by weight portland cement, 0% to approximately 90% by weight slag cement, and 0% to approximately 80% by weight fly ash. In another disclosed embodiment, the cementitious material for use with the present invention comprises 0% to approximately 60% by weight portland cement, 0% to approximately 90% by weight slag cement, and 0% to approximately 80% by weight fly ash. In another disclosed embodiment, the cementitious material for use with the present invention comprises 0% to approximately 50% by weight portland cement, 0% to approximately 90% by weight slag cement, and 0% to approximately 80% by weight fly ash. In another disclosed embodiment, the cementitious material for use with the present invention comprises less than 50% by weight portland cement, 10% to approximately 90% by weight slag cement, and 10% to approximately 80% by weight fly ash. In another disclosed embodiment, the cementitious material for use with the present invention comprises approximately 10% to approximately 45% by weight portland cement, approximately 10% to approximately 90% by weight slag cement, and 10% to approximately 80% by weight fly ash. In another disclosed embodiment, the cementitious material for use with the present invention comprises approximately 10% to approximately 40% by weight portland cement, approximately 10% to approximately 90% by weight slag cement, and 10% to approximately 80% by weight fly ash. In another disclosed embodiment, the cementitious material for use with the present invention comprises approximately 10% to approximately 35% by weight portland cement, approximately 10% to approximately 90% by weight slag cement, and 10% to approximately 80% by weight fly ash.

In another disclosed embodiment, the cementitious material for use with the present invention comprises 0% to approximately 100% by weight portland cement; 0% to approximately 90% by weight slag cement; 0% to approximately 80% by weight fly ash; 0% to 10% by weight ceramic fiber; and 0% to approximately 25% by weight calcium oxide, calcium hydroxide, latex, acrylic, or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 20% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises 0% to approximately 100% by weight portland cement; 0% to approximately 90% by weight slag cement; 0% to approximately 80% by weight fly ash; and 0.1% to 15% by weight ceramic fiber. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 15% by weight ceramic fiber. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises less than 50% by weight portland cement; 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 40% by weight portland cement; approximately 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 10% by weight ceramic fiber.

In another disclosed embodiment, the cementitious material for use with the present invention comprises 0% to approximately 100% by weight portland cement; 0% to approximately 90% by weight slag cement; 0% to approximately 80% by weight fly ash; 0% to 30% by weight Wollastonite; and 0% to approximately 25% by weight calcium oxide, calcium hydroxide, latex, acrylic or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises 0% to approximately 100% by weight portland cement; 0% to approximately 90% by weight slag cement; 0% to approximately 80% by weight fly ash; and 0.1% to 30% by weight Wollastonite. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises less than 50% by weight portland cement; 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 40% by weight portland cement; approximately 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 30% by weight Wollastonite.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; and 0.1% to approximately 50% by weight polymer for making polymer modified concrete, mortar or plaster. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight polymer for making polymer modified concrete, mortar or plaster.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; and 0.1% to approximately 50% by weight ceramic fiber. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight ceramic fiber.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; 0.1% to approximately 50% by weight ceramic fiber and 0.1% to approximately 50% by weight polymer for making polymer modified concrete, mortar or plaster. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight ceramic fiber and 0.1% to approximately 50% by weight polymer for making polymer modified concrete, mortar or plaster.

The portland cement, slag cement and fly ash can be combined physically or mechanically in any suitable manner and is not a critical feature. For example, the portland cement, slag cement and fly ash can be mixed together to form a uniform blend of dry material prior to combining with the aggregate and water. If dry polymer powder is used, it can be combined with the cementitious material and mixed together to form a uniform blend prior to combining with the aggregate or water. If the polymer is a liquid, it can be added to the cementitious material and combined with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the preferred concrete for use with the present invention. Such chemical admixtures include, but are not limited to, accelerators, retarders, air entrainments, plasticizers, superplasticizers, coloring pigments, corrosion inhibitors, bonding agents and pumping aid.

Mineral admixtures or additional supplementary cementitious material ("SCM") can also be used with the concrete of the present invention. Such mineral admixtures include, but are not limited to, silica fume, glass powder and high reactivity metakaolin. Although mineral admixtures can be used with the concrete of the present invention, it is believed that mineral admixtures are not necessary.

The concrete mix cured in a concrete form in which the temperature of the curing concrete is controlled in accordance with the present invention, especially controlled to follow a predetermined temperature profile, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and fly ash in amounts such that at seven days the concrete mix cured in accordance with the present invention has a compressive strength at least 25% greater than the same concrete mix would have after seven days in a conventional (i.e., non-insulated) concrete form under ambient conditions. In another disclosed embodiment, the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement, slag cement and fly ash in amounts such that at seven days the concrete mix cured in accordance with the present invention has a compressive strength at least 25% greater than the same concrete mix would have after seven days in a conventional concrete form under ambient conditions. In another disclosed embodiment the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement and slag cement in amounts such that at seven days the concrete mix cured in accordance with the present invention has a compressive strength at least 25% greater than the same concrete mix would have after seven days in a conventional concrete form under ambient conditions. In another disclosed embodiment, the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement and fly ash in amounts such that at seven days the concrete mix cured in accordance with the present invention has a compressive strength at least 25% greater than the same concrete mix would have after seven days in a conventional concrete form under ambient conditions. In another disclosed embodiment the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

It is specifically contemplated that the cementitious-based material from which the concrete is made can include reinforcing fibers made from material including, but not limited to, steel, plastic polymers, glass, basalt, Wollastonite, carbon, and the like. The use of reinforcing fiber is particularly preferred in the concrete made from polymer modified concrete, mortar and plasters, which provide the concrete wall in accordance with the present invention improved flexural strength, as well as improved wind load capability and blast and seismic resistance.

It should be understood, of course, that the foregoing relates only to certain disclosed embodiments of the present invention and that numerous modifications or alterations may be made therein without departing from the spirit and scope of the invention.

What is claimed is:

1. A method comprising:
   placing plastic concrete in a first concrete mold defined by a first mold panel and a second mold panel;
   placing plastic concrete in a second concrete mold defined by the second mold panel and a third mold panel, wherein the first and second molds are in thermal communication with each other through the second mold panel;
   providing thermal insulating material substantially surrounding the first and second molds but not between the first and second molds, wherein the thermal insulating material has an R-value of greater than 4; and
   allowing the plastic concrete within the first and second concrete molds to at least partially cure.

2. The method of claim 1, further comprising:
   removing the partially cured concrete from the first and second concrete molds;
   placing the partially cured concrete from the first and second concrete molds in an insulated enclosure; and
   allowing the partially cured concrete within the enclosure to further cure.

3. The method of claim 1, wherein the first and second concrete molds comprise a battery mold.

4. The method of claim 1, wherein the first, second and third mold panels are movable.

5. The method of claim 1, wherein the thermal insulating material is a polymer foam.

6. The method of claim 5, wherein the polymer foam is polyvinyl chloride, urethane, polyurethane, polyisocyanurate, phenol, polyethylene, polyimide or polystyrene.

7. The method of claim 5, wherein the polymer foam is polystyrene, polyisocyanurate or polyurethane.

8. The method of claim 7, wherein the polymer foam has an R-value greater than 8.

9. A method comprising:
   placing plastic concrete in a first concrete mold defined by a first mold panel and a second mold panel;
   placing plastic concrete in a second concrete mold defined by the second mold panel and a third mold panel, wherein the first and second molds are in thermal communication with each other through the second mold panel;
   providing thermal insulating material substantially surrounding the first and second molds but not between the first and second molds, wherein the thermal insulating material has an R-value of approximately 4 to approximately 40; and
   allowing the plastic concrete within the first and second concrete molds to at least partially cure.

* * * * *